United States Patent
Nalawade et al.

(10) Patent No.: US 8,797,096 B2
(45) Date of Patent: Aug. 5, 2014

(54) CROSSTALK COMPENSATION FOR HIGH SPEED, REDUCED SWING CIRCUITS

(75) Inventors: Prasad S. Nalawade, Maharashtra (IN); Veena Prabhu, Bangalore (IN); Krishnan S. Rengarajan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 55 days.

(21) Appl. No.: 13/316,067

(22) Filed: Dec. 9, 2011

(65) Prior Publication Data
US 2013/0147547 A1 Jun. 13, 2013

(51) Int. Cl.
*H03K 5/00* (2006.01)
(52) U.S. Cl.
USPC ............... 327/551; 327/34; 327/309; 716/6
(58) Field of Classification Search
USPC ............ 327/551–559, 309, 321, 34; 716/6, 716/13–16
See application file for complete search history.

(56) References Cited

U.S. PATENT DOCUMENTS

| | | | | | |
|---|---|---|---|---|---|
| 4,293,739 | A * | 10/1981 | Iijima | ............................ | 379/417 |
| 5,568,395 | A | 10/1996 | Huang | | |
| 5,994,946 | A | 11/1999 | Zhang | | |
| 6,615,395 | B1 | 9/2003 | Hathaway et al. | | |
| 7,170,312 | B2 * | 1/2007 | Kawasumi | ........................ | 326/21 |
| 7,383,522 | B2 | 6/2008 | Murgai et al. | | |
| 7,685,549 | B2 * | 3/2010 | Sinha et al. | ..................... | 716/115 |
| 7,864,605 | B2 * | 1/2011 | Lee et al. | ........................ | 365/198 |
| 8,036,051 | B2 * | 10/2011 | Park et al. | ....................... | 365/198 |
| 2001/0037160 | A1 | 11/2001 | Kumata | | |
| 2010/0226241 | A1 | 9/2010 | Schmatz et al. | | |

FOREIGN PATENT DOCUMENTS

| | | |
|---|---|---|
| JP | 62025526 A | 2/1987 |
| JP | 6086006 A | 3/1994 |
| JP | 2001044372 A | 2/2001 |
| JP | 2003158238 A | 5/2003 |

OTHER PUBLICATIONS

C. Duan et al., "On and Off-Chip Crosstalk Avoidance in VLSI Design", 2010, Springer Science+Business Media, LLC, New York, NY, 5 pages.

D. Pamunuwa et al., "Maximizing Throughput Over Parallel Wire Structures in the Deep Submicrometer Regime", IEEE Transactions on Very Large Scale Integration (VLSI) Systems, Apr. 2003, pp. 224-243, vol. 11, No. 2.

Altera Corporation, White Paper, "Basic Principles of Signal Integrity", WP-SGNLNTGRY-1.3, Dec. 2007, ver. 1.3, pp. 1-4.

H. Kaul et al., "Clock Net Optimization using Active Shielding", EECS Department, University of Michigan, Sep. 2003, 4 pages, http://www.gigascale.org.

(Continued)

*Primary Examiner* — Dinh T. Le
(74) *Attorney, Agent, or Firm* — David Cain; Roberts Mlotkowski Safran & Cole, P.C.

(57) ABSTRACT

Structures and methods are provided for reducing or eliminating crosstalk in devices. Based on a predetermined compensation schemes, a compensation scheme is selected that minimizes the deviation of the non-aggressed victim signal caused by one or more aggressor signals. Instances of a compensation circuit corresponding to the selected compensation scheme are placed along a victim signal line at locations defined by the compensation scheme.

20 Claims, 17 Drawing Sheets

(56) References Cited

OTHER PUBLICATIONS

H. Zhang et al., "Low-Swing On-Chip Signaling Techniques: Effectiveness and Robustness," IEEE Transactions on Very Large Scale Integration (VLSI) Systems, Jun. 2000, pp. 264-272, vol. 8, No. 3.

K. Lee et al., "Low-Power Network-on-Chip for High-Performance SoC Design," IEEE Transactions on Very Large Scale Integration (VLSI) Systems, Feb. 2006, pp. 148-160, vol. 14, No. 2.

* cited by examiner

| Compensation provided at every (μm) | Compensation capacitance (fF) |
|---|---|
| 600 | 30 |
| 800 | 40 |
| 1000 | 50 |

FIG. 5E

| 571 | 572 | 573 | 574 | 575 | 576 | 577 | 578 |
|---|---|---|---|---|---|---|---|
| Maximum length of the line (μm) | Compensation provided at every (μm) | Timing deviation without compensation (ps) | Timing deviation with compensation (ps) | Deviation at aggression point without compensation (mV) | Deviation at aggression point with compensation (mV) | Deviation at post-aggression point without compensation (mV) | Deviation at post-aggression point with compensation (mV) |
| 3000 | 600 Same | 199.1 | 36.24 | -324.3 | 77.63 | -67 | -47 |
| 3000 | 600 Opposite | -178.2 | 123.1 | 315 | -167 | 69.88 | -73.96 |
| 3200 | 800 Same | 262.55 | -63.14 | 76.53 | 51.54 | 223 | 87.17 |
| 3200 | 800 Opposite | -288.3 | 80.74 | 77.38 | -40.9 | -283.5 | 46.85 |
| 3000 | 1000 Same | -169.1 | 15.2 | 270.2 | -72.58 | 71.36 | -24.41 |
| 3000 | 1000 Opposite | 208 | 110.1 | -284 | -38.5 | -68.72 | -55.65 |

FIG. 5F

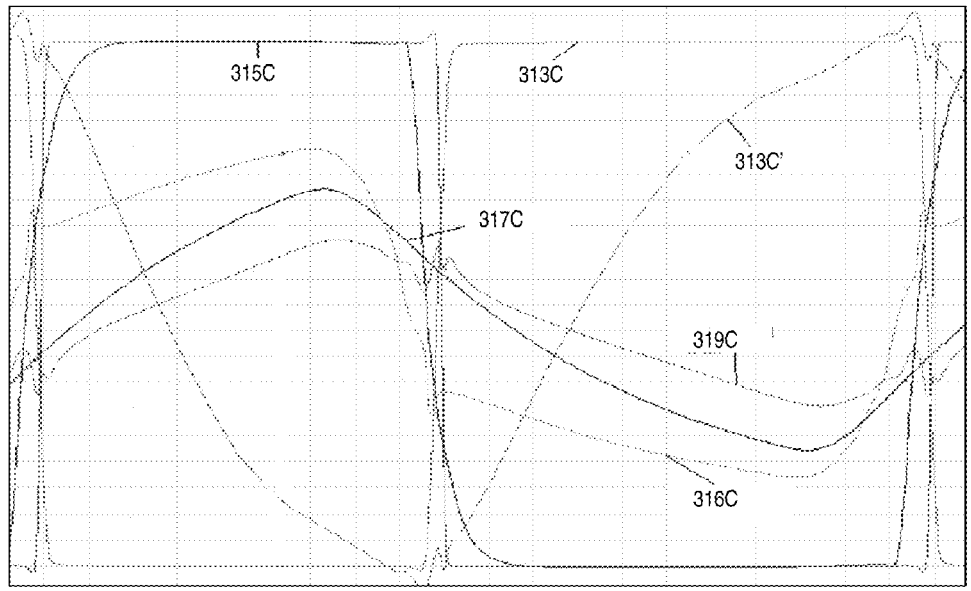

FIG. 6E

| 671 | 672 | 673 | 674 | 675 | 676 | 677 | 678 |
|---|---|---|---|---|---|---|---|
| Second Compensation provided at | Direction | Timing deviation without compensation (ps) | Timing deviation with compensation (ps) | Deviation at aggression point without compensation (mV) | Deviation at aggression point with compensation (mV) | Deviation at post-aggression point without compensation (mV) | Deviation at post-aggression point with compensation (mV) |
| Every 800μm C1=40F,C2=30F | Opposite | 227.9 | 11.4 | -296.9 | -17.9 | -74.8 | -9.7 |
| | Same | -195.57 | 238.31 | 284.24 | -57.74 | 79.91 | -140.3 |
| Every 1600μm C1=40F,C2=30F | Opposite | 226.9 | 43.8 | -314.4 | 35.13 | -76.07 | -24.59 |
| | Same | -192.6 | 133.8 | 300.41 | -69.59 | 75.68 | -100.71 |
| Every 1600μm C1=40F,C2=15F | Opposite | 222.3 | 41.31 | -302 | -4.34 | -75.8 | -42.4 |
| | Same | -203.2 | 128.2 | 295 | -91.28 | 77.39 | -70.1 |
| Only at 1600μm C1=40F,C2=15F | Opposite | 215.8 | 78.46 | -291.47 | 38.3 | -71.55 | -42.21 |
| | Same | -199.3 | 68.72 | 289.31 | -103 | 74.46 | -49.56 |
| Only at 3200μm C1=40F,C2=15F | Opposite | 220.2 | 53.94 | -292.34 | 31.2 | -72.8 | -40.8 |
| | Same | -200.2 | 105.9 | 294 | -93.7 | 75.16 | -57.56 |

| Corner | Direction | Timing deviation without compensation (ps) | Timing deviation with compensation (ps) | Deviation at aggression point without compensation (mV) | Deviation at aggression point with compensation (mV) | Deviation at post-aggression point without compensation (mV) | Deviation at post-aggression point with compensation (mV) |
|---|---|---|---|---|---|---|---|
| FF-Cold-Full Swing | Opposite | 177.8 | 85.73 | -301.02 | 47.77 | -73.12 | -63.26 |
| FF-Cold-Reduced Swing | Opposite | 213.4 | 89.94 | -304 | 51.67 | -70.99 | -49.82 |
| SS-Cold-Full-Swing | Same | -166.85 | 54.09 | 295 | -119 | 77.87 | -31.27 |
| SS-Cold-Reduced Swing | Same | -178.6 | 53.96 | 294 | -113 | 80.535 | -40.21 |

| Corner and Swing | Direction | Timing deviation without compensation (ps) | Timing deviation with compensation (ps) | Deviation at aggression point without compensation (mV) | Deviation at aggression point with compensation (mV) | Deviation at post-aggression point without compensation (mV) | Deviation at post-aggression point with compensation (mV) |
|---|---|---|---|---|---|---|---|
| SS-Cold-Full Swing | Opposite | 194.8 | 69.47 | -302 | -40.4 | -77.96 | -24.67 |
| SS-Cold-Reduced Swing | Opposite | 231.5 | 59.43 | -301.8 | -30.81 | -78.54 | -7.84 |
| FF-Hot-Full-Swing | Same | -215.2 | 239.7 | 290 | -47.9 | 69.61 | -145.45 |
| FF-Hot-Reduced Swing | Same | -219.6 | 257.4 | 289 | -13.1 | 70.97 | -145.61 |

| Initial State A1 v A2 | Timing deviation without compensation (ps) | Timing deviation with compensation C1=30fF (ps) | Timing deviation with compensation C1=40fF (ps) | Initial State A1 v A2 | Deviation at aggression point without compensation (mV) | Deviation at aggression point with compensation C1=30fF (mV) | Deviation at aggression point with compensation C1=40fF (mV) |
|---|---|---|---|---|---|---|---|
| HhH | 31.47 | 52.29 | 56.56 | HhH | -385.1 | 56.7 | 134 |
| HhL | -60 | 31.79 | 55.19 | HhL | -302.9 | 49.09 | 103.2 |
| HlH | -51.02 | 32.37 | 35.64 | HlH | 367 | 106 | 51.8 |
| HlL | 196.5 | 165.6 | 38.22 | HlL | 284 | 76 | 30.6 |
| LhH | 253 | 92.61 | 91.94 | LhH | 292 | 66 | 17.8 |
| LhL | 91.8 | 23.06 | 94.16 | LhL | 339 | 89.7 | 38.7 |
| LlH | -86.5 | 38.09 | 138.3 | LlH | 286 | 61.2 | 117 |
| LlL | -39.65 | 80.46 | 136.7 | LlL | -192 | 83.8 | 117 |

| 901 | 902 | 903 | 904 | 905 | 906 | 907 | 908 |
|---|---|---|---|---|---|---|---|
| Long Interconnect (Net) Name Victim | Aggressor Details: Number of aggressors/ Switching direction & phase info. | PVT Details along with systematic and random effects | Timing & Voltage deviation without compens- ation (ps, mV) | Compensati on scheme (based on interconnect & signaling context) | Preferred Locations & Number of Occurrences | Timing & Voltage deviation with compensation (ps, mV) % improvement | Conclusion (Scheme Selection) |
| <data> | <data> | <data> | <data> | <data> | <data> | <data> | <data> |

FIG. 9B

CROSSTALK COMPENSATION FOR HIGH SPEED, REDUCED SWING CIRCUITS

FIELD OF THE INVENTION

The invention relates to wire routing and, more particularly, to processes, structures and methods of manufacturing electronic devices having crosstalk compensation.

BACKGROUND

When wires are routed close to one another in electronic devices, such as a printed circuit board (PCB) or an integrated circuit (IC), signals traveling on the wires may distort signals on neighboring wires. This distortion is termed "crosstalk." Crosstalk is primarily due to capacitive-coupling between the wires which causes the signal on an "aggressor" wire to distort the signal on a "victim" wire. Crosstalk may substantially reduce the quality of signals such that a message received via the victim may be different (i.e., erroneous) than the original message. In terms of digital logic, an aggressor may cause enough distortion to change the logic state (0 or 1) in parts of the victim's signal. The impact of crosstalk is especially troublesome in low-voltage integrated circuits because relatively small changes in the voltage and/or timing of a signal can lead to errors. Indeed, crosstalk greatly limits the speed and increases power consumption of integrated circuits.

Low-swing (a.k.a., reduced swing) on-chip signaling schemes reduce power consumption in system-on-chip designs by using lower voltages (e.g., operating in a range between 0.0 V to 3.6 V peak instead of a full-swing range between 0.0 V to 5.0 V peak). However, due to the lower voltage, such low-swing schemes are more susceptible to crosstalk, which increases the risk of signal distortion.

Accordingly, there exists a need in the art to overcome the deficiencies and limitations described hereinabove.

SUMMARY

In an aspect of the invention, a crosstalk compensation structure between an aggressor and a victim is provided. The structure comprises a signal buffer including a first inverter and a second inverter connected in series in the aggressor. The structure further comprises a compensation circuit linking the signal buffer to the victim via a first capacitor, wherein the compensation circuit is structured and arranged to reduce distortion of a signal in the victim by reducing crosstalk between the aggressor and the victim.

In another aspect of the invention, a method for compensating for crosstalk coupling between aggressors and victims in a device design is provided. The method comprises identifying a victim having one or more aggressors. The method further comprises determining crosstalk attributes of the victim and the one or more aggressors. The method further comprises, for a plurality of predetermined compensation schemes, determining a deviation between a non-aggressed victim signal and an aggression-compensated victim signal. The method further comprises selecting one of the plurality of the predetermined compensation schemes that minimizes the determined deviation from the non-aggressed victim signal. The identifying, the determining crosstalk attributes and the determining the deviation and the selecting may be performed using a computing device.

In another aspect of the invention a system comprising a compensation circuit connecting a first signal line to a second signal line of an integrated circuit is provided. The compensation circuit is structured and arranged to reduce distortion of a signal in the second signal line by reducing the effect of crosstalk between the first and second signal lines. Further, the crosstalk is caused by capacitive coupling between the first and second signal lines. Further, the compensation circuit provides a compensation signal that is substantially a same magnitude and opposite polarity as the capacitive coupling. Further, the compensation circuit comprises a compensation line connecting the first signal line and the second signal line, and a compensation capacitor in the compensation line.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments.

FIGS. 5E and 5F show exemplary data structures including crosstalk and compensation attributes with respect to the crosstalk compensation circuit illustrated in FIG. 5A;

FIGS. 6B-6E show examples of crosstalk and compensation effects in the crosstalk compensation circuit illustrated in FIG. 6A;

FIG. 6F shows exemplary data structures including crosstalk and compensation attributes with respect to the crosstalk compensation circuit illustrated in FIG. 6A;

FIGS. 8A and 8B show exemplary data structures including crosstalk and compensation attributes in accordance with aspects of the invention;

FIG. 8E shows exemplary data structures including crosstalk and compensation attributes in accordance with aspects of the invention;

FIG. 9B shows exemplary data structures including crosstalk and compensation attributes usable with the flow diagram in FIG. 9A.

DETAILED DESCRIPTION

Figure 1:
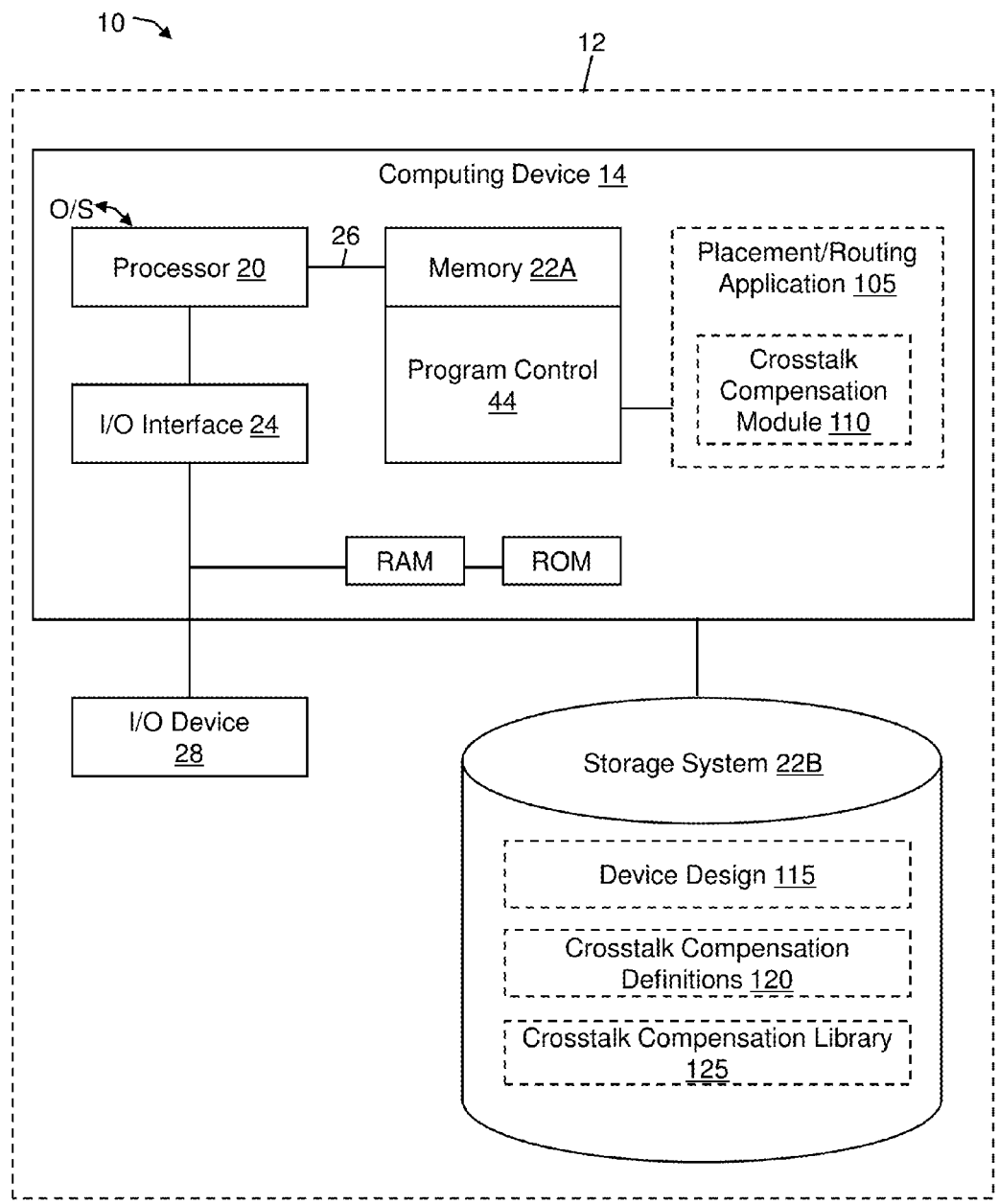
FIG. 1 shows an illustrative environment for implementing designs and steps in accordance with aspects of the invention.

The invention relates to wire routing and, more particularly, to processes, structures and methods of manufacturing electronic devices having crosstalk compensation. According to aspects of the invention, a number of crosstalk compensation schemes are disclosed. In embodiments, one or more of the crosstalk compensation schemes is selected and placed along a signal line to compensate (i.e., cancel or reduce) for the effects of crosstalk. The crosstalk compensation schemes include circuits providing compensation signals to victims that reduce or eliminate crosstalk in the victim from one or more aggressor by substantially cancelling-out the crosstalk effect of aggressor signals. Advantageously, the disclosed embodiments improve signal quality allowing designs that are smaller, faster and/or lower-power.

System Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable mediums having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is an exemplary environment 10 for implementing the steps in accordance with aspects of the invention. To this extent, the environment 10 includes a server or other computing infrastructure 12 that can perform the processes described herein. In particular, the computer infrastructure 12 includes a computing device 14. The computing device 14 can be resident on a network infrastructure or computing device of a third party service provider (any of which is generally represented in FIG. 1).

The computing device 14 also includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 14 is in communication with the external I/O device/resource 28 and a storage system 22B. For example, the I/O device 28 can comprise any device that enables an individual to interact with the computing device 14 (e.g., user interface) or any device that enables the computing device 14 to communicate with one or more other computing devices using any type of communications link. The external I/O device/resource 28 may be for example, a handheld device, PDA, handset, keyboard etc.

In general, the processor 20 executes computer program code (e.g., program control 44), which can be stored in the memory 22A and/or storage system 22B. Moreover, in accordance with aspects of the invention, the program control 44 controls a placement/routing application 105 and a crosstalk compensation module 110 that perform one or more of the processes described herein. The placement/routing application 105 and the crosstalk compensation module 110 can be implemented as one or more sets of program code in the program control 44 stored in memory 22A as separate or combined modules. Additionally, the placement/routing application 105 and the crosstalk compensation module 110 may be implemented as separate dedicated processors or a single or several processors to provide the function of these tools.

While executing the computer program code, the processor 20 can read and/or write data to/from memory 22A, storage system 22B, and/or I/O interface 24. The program code executes the processes of the invention, for example, placement/routing application 105 and crosstalk compensation module 110. Further, data read and/or write data to/from memory 22A, storage system 22B and/or I/O interface 24 may include device design 115, crosstalk compensation definitions 120 and a crosstalk compensation library 125. The bus 26 provides a communication link between each of the components in the computing device 14.

In accordance with aspects of the invention, the placement/routing application 105 is computer program code (or a dedicated processor) stored in, for example, the memory 22A and/or the storage system 22B that, when executed by the processor 20, causes the computing device 14 to place signal lines and clocks in the device design 115. The placement/routing application 105 may include any combination of software modules applications and hardware modules for designing, modeling, verifying and/or optimizing signal lines in an IC using a hardware description language, such as VERILOG or VHDL. For instance, placement/routing application 105 may be a synthesis/placement CAD tool that reads in design definitions (e.g., VHDL), physical area constraints, timing constraints, power constraints, design library information, synthesis rules, and operating conditions. Using these various parameters, placement/routing application 105 may iteratively determine routes for signal lines and clocks in the device design 115, between predefined connection points (e.g., terminals or contacts) of design elements (e.g., logic blocks, buffers, latches, etc.). The determined routing and associated information may be stored by the computing device 14 in storage system 22B in the device design 115. Information in the device design 115 may be referenced by the placement/routing application 105 and the crosstalk compensation module 110 to identify signal lines (e.g., aggressors and victims), to analyze (via, e.g., modeling and simulation) crosstalk between aggressors and victims, and to determine parameters related to the crosstalk and to select crosstalk compensation schemes.

As described in greater detail below, the placement/routing application 105 may determine the placement of crosstalk compensation circuits in the device design 115 based on information determined by the crosstalk compensation module 110. In embodiments, crosstalk compensation module 110 is program code that, when executed by the processor 20, controls the computing device 14 to perform steps to determine crosstalk compensation schemes for the signal lines included in the device design 115 based on, for example, the crosstalk compensation definitions 120 and the crosstalk compensation library 125.

In embodiments, the placement/routing application 105 may place compensation circuits along the signal lines in the device design 115 based on selections of compensation circuit schemes by the crosstalk compensation module 110 using the crosstalk compensation library 125. Alternatively or additionally, the computing device 14 may execute an interactive computer-user interface via I/O device 28 that prompts the user to provide some or all of this information. For example, the crosstalk compensation module 110 may identify one or more compensation schemes and prompt a design engineer to select one of the schemes based on his/her design experience via an interactive user interface provided by the computing device 14 via I/O device 28.

The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computing infrastructure 12 is only illustrative of various types of computer infrastructures for implementing the invention. For example, in embodiments, the computing infrastructure 12 comprises two or more computing devices (e.g., a server cluster) that communicate over any type of communications link, such as a network, a shared memory, or the like, to perform the process described herein. Further, while performing the processes described herein, one or more computing devices on the computing infrastructure 12 can communicate with one or more other computing devices external to the computing infrastructure 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Compensation Schemes

In accordance with aspects of the invention, crosstalk compensation schemes (e.g., a distribution of compensation circuits) are implemented in device design 115 to provide compensation (e.g., cancellation) signals that reduce or eliminate the effects of crosstalk on victim signal lines. The crosstalk compensation module 110 identifies victims and selects crosstalk compensation schemes based on various attributes of an identified victim and its aggressors. From this information, the crosstalk compensation module 110 may advise a user (e.g., a design engineer) on placement (i.e. location and occurrences) of proposed compensation circuits for victims via interaction with I/O device 28, for example. Further, the identification of compensation schemes may be automatically placed by placement/routing application 105.

Figure 2A:
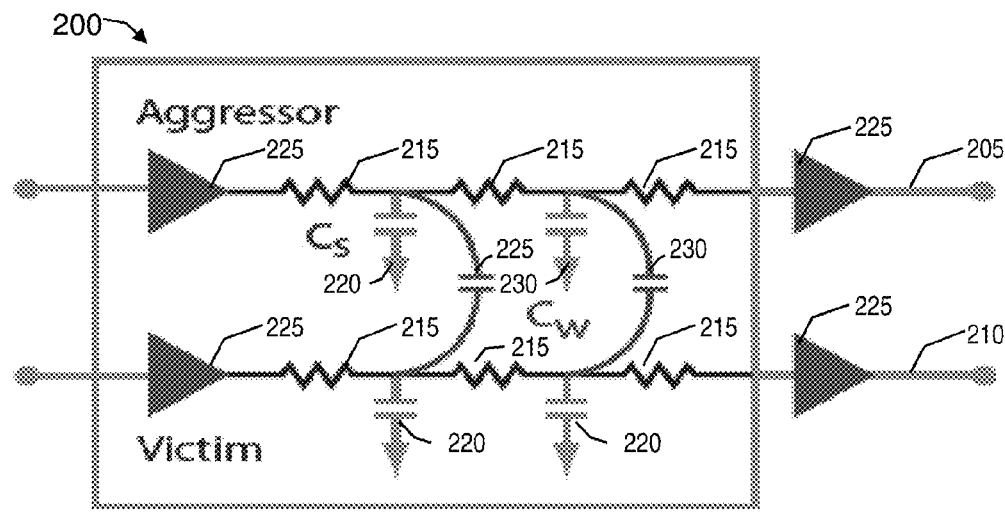
FIG. 2A shows an example of crosstalk in a system.
Figure 2B:
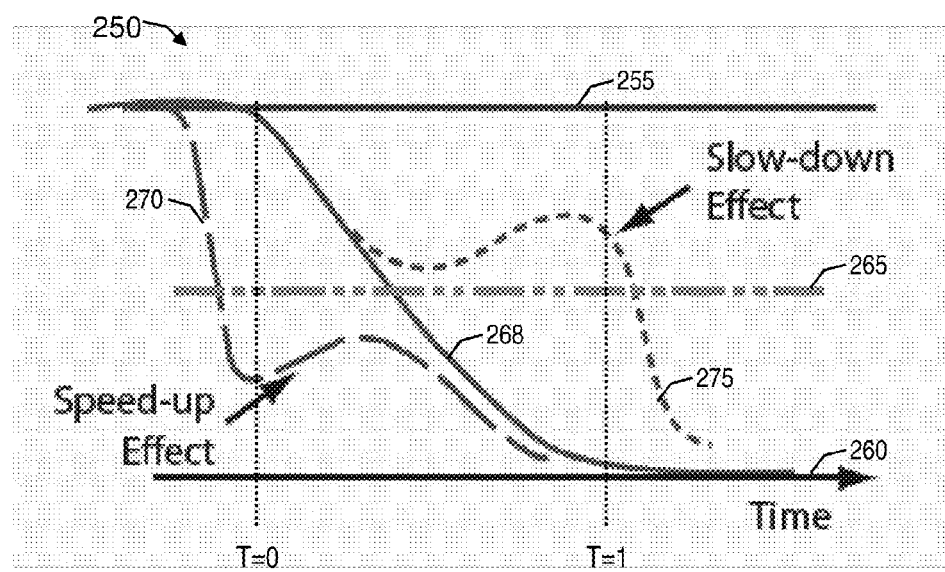
FIG. 2B shows an example of crosstalk effects in the system illustrated in FIG. 2A.

FIGS. 2A and 2B illustrate crosstalk in a conventional example. FIG. 2A provides a model circuit 200 including an aggressor 205 ("aggressor") and a victim 210 ("victim"). Both the aggressor 205 and the victim 210 are electrical signal lines modeled as a series of resistors 215 having capacitors 220 tied to ground (e.g., a ground plane) between two buffer circuits 225. The resistors 215 represent the impedance in the signal lines 205, 210. The capacitors 220 represent the coupling between the signal lines 205, 210 and the ground.

The aggressor 205 carries a signal (i.e., "the aggressor signal") that affects a signal carried on the victim 210 (i.e., "the victim signal"). As described above, crosstalk is induced on the victim 210 from the aggressor 205 due to capacitive coupling. This capacitive coupling is modeled in FIG. 2A by capacitors 230.

FIG. 2B illustrates an example of crosstalk on the victim signal. FIG. 2B is a graph 250 of voltage versus time for the victim signal. The upper horizontal line 255 of FIG. 2B represents the maximum voltage of the victim signal (e.g., 5.0 V); the lower horizontal line 260 represents the minimum voltage of the victim signal (e.g., 0.0 V); and the middle horizontal line 265 represents the half-maximum voltage of the victim signal (e.g., 2.5 V).

The graph 250 also shows an original, unaffected victim signal (i.e., "the non-aggressed victim signal" or "ideal") 268 as the solid line across the center of the graph. As shown in FIG. 2B, the non-aggressed victim signal transitions smoothly from the high-voltage (e.g., 5.0 V) to the low-voltage (e.g., 0.0 V). In terms of digital logic, the non-aggressed victim signal switches from a logic-high state (i.e., "1") to a logic-low state (i.e., "0").

As should be understood, digital logic requires a signal's voltage to be within certain thresholds to reliably function as a logic-high or a logic low. For instance, the minimum positive voltage applied to the input which will be treated by the device as a logic-high may be 3.7 V. The maximum positive voltage from the logic that will be treated as the low level may be 1.3V. These values are only used for the sake of example. In other logic schemes the thresholds may be different. This is especially so in low-voltage logic, which has narrower thresholds. Accordingly, if crosstalk causes the signal's voltage to become too high or too low, the logic change of the signal may be misinterpreted causing an error.

FIG. 2B shows the non-aggressed victim signal 268 switching from the logic-high state to the logic-low state between periods of time (T=0 or T=1). As should be understood, this switch may be synchronized with a clock. More specifically, synchronous digital logic involves signals that change states within a window of time around a clock pulse (e.g., a trailing edge of the clock signal T=0 and T=1). Thus, if the electrical signal in the victim signal line is distorted by the aggressor such that the victim signal changes its state outside of a window of time around the clock pulse (i.e., too early or too late), the signal's state may be misinterpreted causing an error in a message.

Signals 270 and 275 in FIG. 2B illustrate exemplary timing and voltage distortion of the electrical signal in the victim signal line that may be caused by crosstalk. Signal 270 illustrates an example of a speed-up effect on victim signal caused by an aggressor signal. As a result of the speed-up effect, the voltage of the victim signal in the high-state may be pulled down by the aggressor signal such that, at T=0, signal 270 is incorrectly in a low-state during the next clock interval. On the other hand, signal 275 illustrates an example of a slow-down effect on the victim signal caused by crosstalk from the aggressor signal. In this case, the unaffected victim signal 268 is in a low-state at T=1. However, due to the slow-down effect, the signal 275 may incorrectly remain in the high state at T=1 during the next clock interval. In either case (i.e., speed-up or slow-down), the crosstalk-affected victim signal may produce errors in the devices produced from the device design 115.

Figure 3:
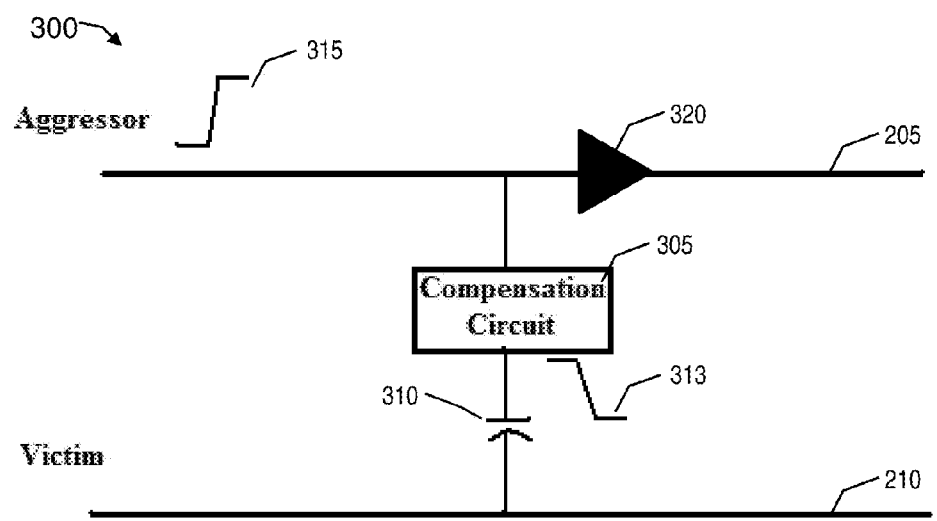
FIG. 3 shows a general crosstalk compensation circuit in accordance with aspects of the invention.

FIG. 3 illustrates a general compensation scheme 300 in accordance with aspects of the disclosed invention. As referred to herein, a compensation scheme may comprise a compensation circuit along with its associated parameters, including locations and number of instances (i.e., occurrences) in a victim.

As shown in FIG. 3, the aggressor 205 and the victim 210 are connected by a compensation circuit 305 and compensation capacitor 310. In accordance with aspects of the invention, the compensation circuit 305 provides a compensation signal 313 having substantially the same magnitude as an aggressor signal 315 and a direction opposite to the aggressor signal 315. The compensation capacitor 310 provides a capacitance sufficient to cancel the coupling capacitance of the victim and aggressor. In embodiments, the compensation circuit 305 and the compensation capacitor 310 are structured and arranged to provide the compensation signal 313 that substantially cancels at least a portion of the aggressor signal 315 to effectively reduce distortion of the signal in the victim 210

According to aspects of the invention, the compensation circuit 305 is placed at a location where the compensation signal 313 will have the greatest effect on the aggressor signal 315. In other words, the compensation circuit 305 is placed at points of maximum aggression. The points of maximum aggression occur around buffer circuits (e.g., buffer circuit 320) along the path of aggressor 205. For example, the function of a buffer (a.k.a., a repeater) is to amplify a signal to prevent the signal from fading (e.g., being attenuated and/or damped) as it travels over a distance (e.g., due to resistive and/or capacitive effects as depicted in FIG. 2A). After being buffered, the aggressor signal 315 typically has its greatest voltage swing (i.e., difference between high and low voltage) and/or the sharpest swing between the signal's low and high logic states. Accordingly, the aggressor signal 315 generates more crosstalk at the location of a buffer circuit 320 in comparison to locations away from the buffer circuit 320 where the signal will have faded.

As shown in FIG. 3, the exemplary compensation circuit 305 is placed between the aggressor 205 and the victim signal line 310 in close proximity to the buffer circuit 320. Further the compensation circuit 305 is configured to generate the compensation signal 313 to compensate (i.e., cancel or reduce) for the aggressor signal 315. Ideally, the compensation signal couples to the victim 210 in a direction opposite to coupling caused by the aggressor 205, such that the characteristics (i.e., original form, voltage and timing) of the non-aggressed victim signal are preserved as if the aggressor signal 315 was not present.

In an optimum case, the compensation circuit 305 has no net effect on the victim signal. However, the introduction of the compensation circuit 305 necessarily alters the form and timing of the victim signal. As such, there are design considerations involved in placing compensation circuits, such as compensation circuit 305, in a design. For instance, a number of signals may synchronously travel in a device between a source and a destination. The operation of a device may depend on these signals arriving on schedule. However, if crosstalk compensation delays the arrival of one of these signals, the device may not function as designed. There is, however, typically some slack in each signal's schedule (i.e., an arrival window). Accordingly, a selected compensation scheme, including all the compensation circuits between the victim signal's source and destination, effectively compensates crosstalk while providing a timing deviation that remains within the acceptable slack.

Figure 4A:
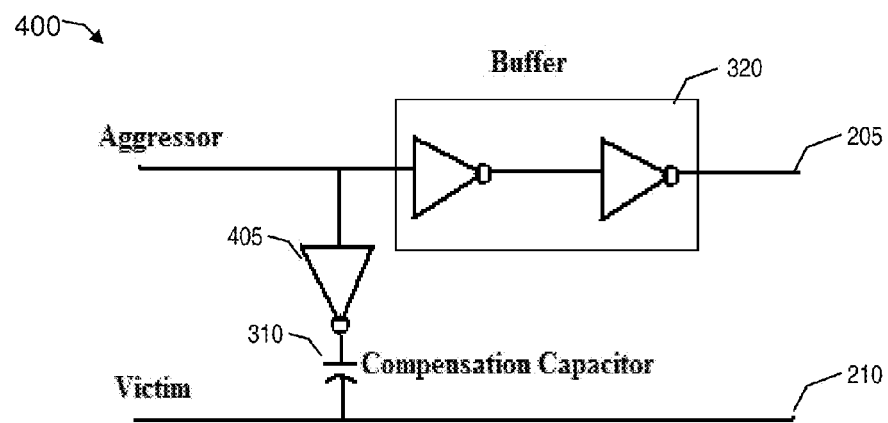
FIG. 4A shows a first crosstalk compensation circuit in accordance with aspects of the invention.

FIG. 4A illustrates a first compensation scheme 400 accordance with aspects of the invention. In scheme 400, the general compensation circuit of FIG. 3 is embodied as an inverter 405 located before the buffer circuit 320. The inverter 405 input is linked to the aggressor 205 in close spatial proximity to the input of the buffer circuit 320. The inverter 405 output is linked to the victim 210 via the compensation capacitor 310. The inverter 405 provides the victim 210 with a compensation signal that is substantially inverse to and substantially equal in magnitude to the aggressor signal.

Figure 4B:
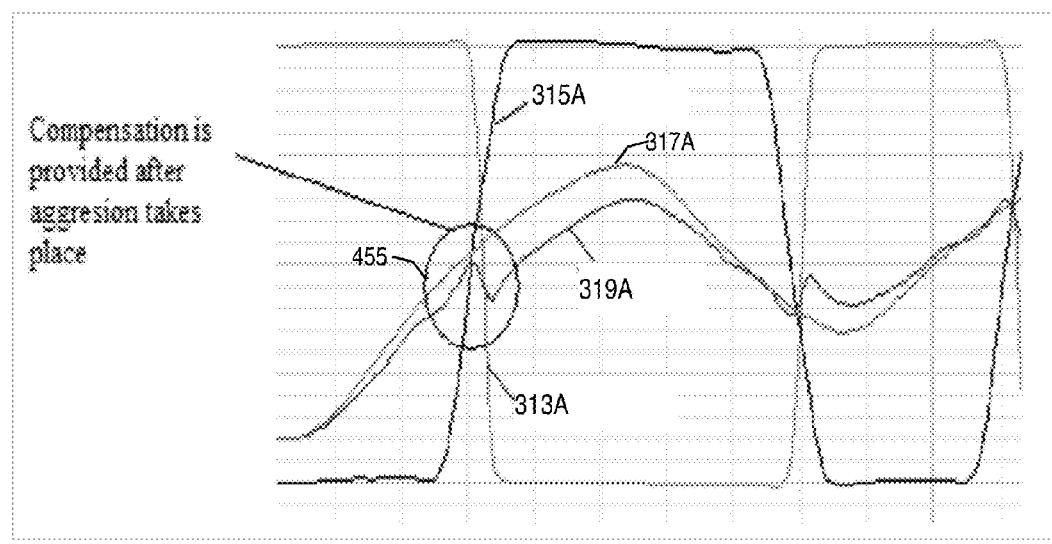
FIG. 4B shows an example of crosstalk and compensation effects in the crosstalk compensation circuit illustrated in FIG. 4A.

FIG. 4B illustrates the effects of compensation signal 313A and the aggressor signal 315A on the non-aggressed victim signal 317A in accordance with the first compensation scheme (e.g., scheme 400 shown in FIG. 4A). FIG. 4B illustrates four exemplary signals: the compensation signal 313A, the aggressor signal 315A, a non-aggressed victim signal 317A (i.e., "the ideal" or "the target signal") and the compensated victim signal 319A. Given the voltage swing of the aggressor signal 315A with respect to the non-aggressed victim signal 317A, the non-aggressed victim signal 317A would be greatly affected were no compensation provided. However, as evident in FIG. 4B, the compensated victim signal 319A follows the non-aggressed victim signal 317A with little distortion. Notably, around area 455 where the compensation signal 313A and the aggressor signal 315A cross, a mismatch in delays causes the compensation signal 313A to arrive early, such that crosstalk from the aggressor signal 315A takes place after the compensation signal 313A such that the compensated victim signal 319A is distorted by the compensation signal 313A. Nevertheless, the compensated victim signal 319A is better in comparison to that which would result had no compensation signal 313A been provided.

Figure 5A:
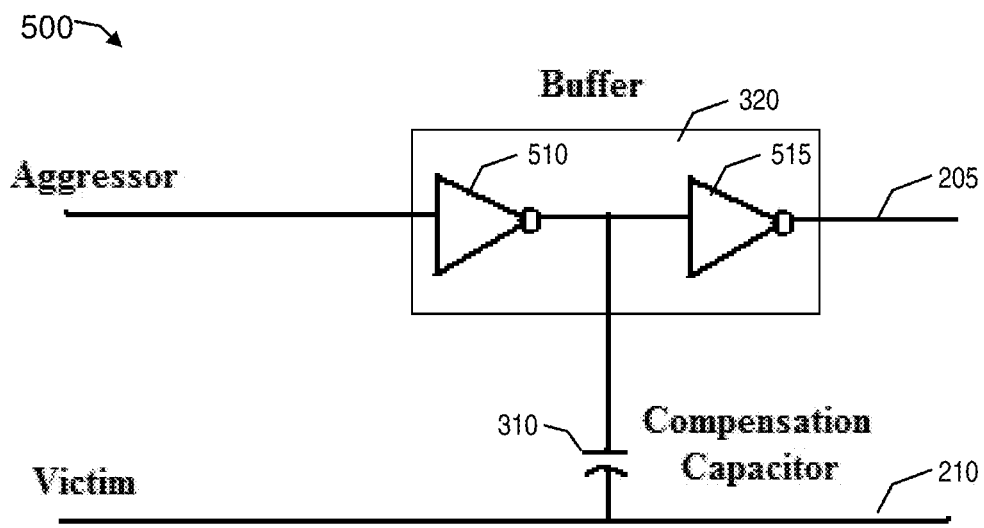
FIG. 5A shows a second crosstalk compensation circuit in accordance with aspects of the invention.

FIG. 5A illustrates a second compensation scheme 500 in accordance with embodiments of the invention. As shown in FIG. 5A, the general compensation circuit of FIG. 3 is eliminated, leaving the compensation capacitor 310. In scheme 500, the compensation capacitor 310 is linked to the aggressor 205 between inverters 510, 515 of the buffer circuit 320. That is, compensation capacitor 310 is placed between the output of the first inverter 510 and the input of the second inverter 515 in the buffer circuit 320.

Figure 5B:
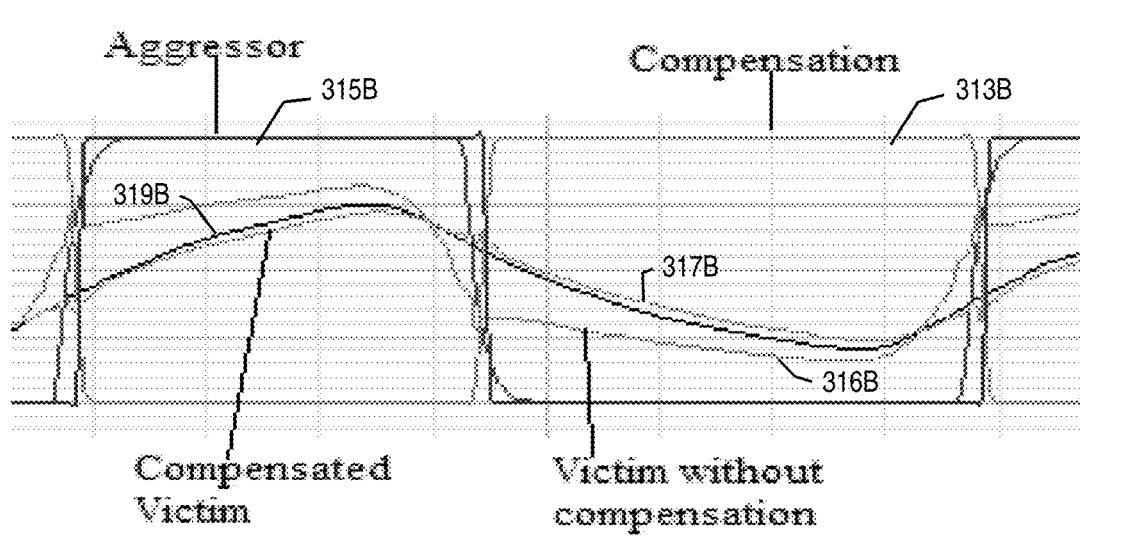
FIGS. 5B-5D show examples of crosstalk and compensation effects in the crosstalk compensation circuit illustrated in FIG. 5A.
Figure 5C:
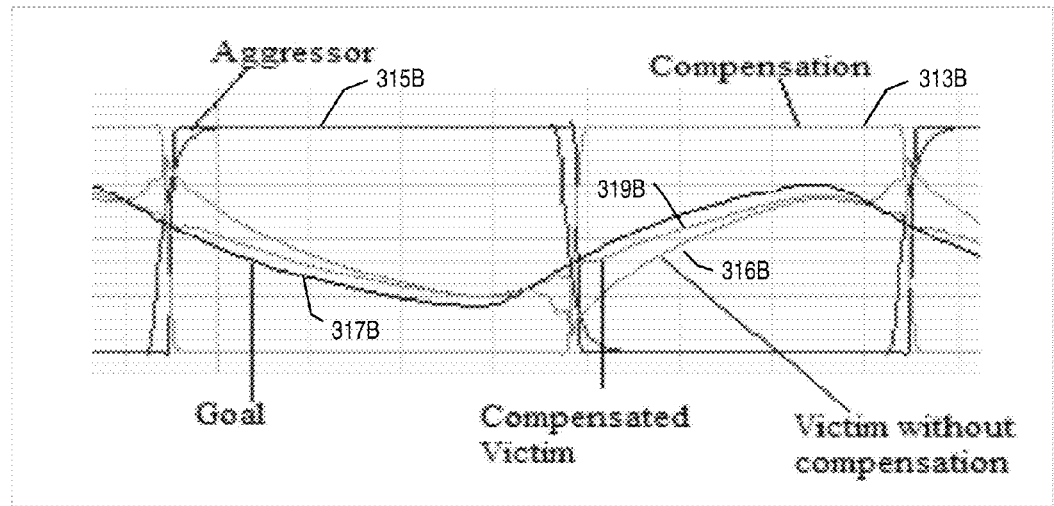

FIG. 5B illustrates the effect of the compensation scheme 500 in a circumstance where the aggressor and victim switch in the same direction (i.e., both swing from a low logic state to a high logic state at or near the same time; or both swing from a high logic state to a low logic state at or near the same time). FIG. 5C, in contrast, illustrates the effect of the compensation scheme 500 in a circumstance where the aggressor and the victim switch in the opposite directions. FIGS. 5B and 5C include five exemplary signals: compensation signal 313B, aggressor signal 315B, uncompensated (i.e., aggressed) victim signal 316B, non-aggressed victim signal 317B and compensated victim signal 319B, wherein the compensation signal 313B is substantially the inverse of the aggressor signal 315B. As evident from both FIG. 5B and FIG. 5C, the voltage and timing of aggressed victim signal 316B is greatly affected by the aggressor signal 315B. In comparison, the compensated victim signal 319B substantially follows the non-aggressed victim signal 317B, with much less distortion than the aggressed (uncompensated) victim signal 316B.

Figure 5D:
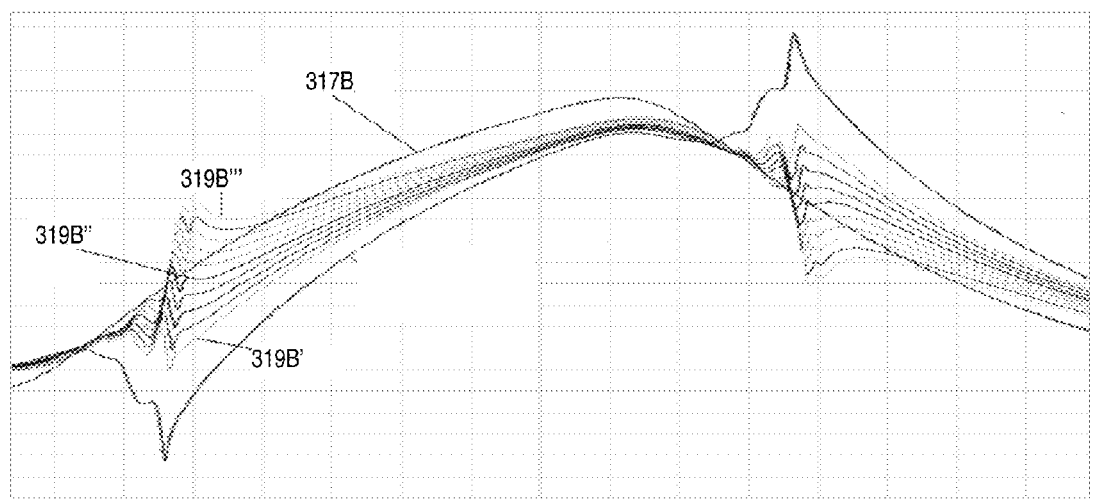

FIG. 5D illustrates exemplary crosstalk simulations of different compensated victim waveforms 319B, in which compensation capacitor 310 has values ranging between 15 fF through 50F for a given length of line. The optimum capacitance value for compensation capacitor 310 in compensation scheme 500 can be selected based on the simulated waveform that is closest to the goal (i.e. a non-aggressed waveform 317B).

Table 5E shows the optimum capacitance values chosen for different line lengths from simulations such as for FIG. 5D. Such data for various victim-aggressor geometrical relationships (such as widths, lengths, spacings, metal layer etc) can be determined (e.g., by placement/routing application 105) and recorded in a database (e.g., crosstalk compensation library 125) for future reference by a computing device (e.g., computing device 14 executing placement/routing application 105 and/or crosstalk compensation module 110) in a design process (e.g., FIG. 9 below) that selectively places compensation schemes in an IC design (e.g. device design 115).

FIG. 5F illustrates exemplary data corresponding to the capacitances selected for compensation scheme 500 based on the simulation illustrated in FIG. 5E that may be recorded within a data structure (e.g., in crosstalk compensation library 125) for future reference. The row having "600 same" in column 572 corresponds to a compensation capacitance of 30 fF, as does the adjacent rows below. Similarly, the row having "800 same" in column 572 corresponds to a compensation capacitance of 40 fF, as does the adjacent row below. Likewise, the row having "1000 same" in column 572 corresponds to a compensation capacitance of 50 fF, as does the adjacent row below. Column 571 in FIG. 5F represents signal line lengths of the aggressor and victim signal lines. For each respective combination of span length, maximum line length and compensation capacitance, deviations caused in the non-aggressed victim signal 317B were measured in both directions, i.e., the same direction as the aggressor signal 315B and the opposite direction of the aggressor signal 315B, as indicated by adjacent rows in FIG. 5F.

The attributes in the columns 571-578 of FIG. 5F show the deviations in timing and voltage from the non-aggressed victim signal (e.g., non-aggressed victim signal 317B) for the different combinations of maximum line length spans and compensation capacitances. More specifically, column 573 shows the timing deviation of an aggressed victim signal (e.g., signal 316B) without compensation. Column 574 shows the timing deviation of an aggressed victim signal with compensation (e.g., signal 319B). Column 575 shows the maximum voltage deviation of an aggressed victim signal without compensation at the aggression point (e.g., at buffer circuit 320). Column 576 shows the maximum voltage deviation of an aggressed victim signal with compensation at the aggression point. Column 577 shows the maximum voltage deviation of an aggressed victim signal without compensation after the aggression point (e.g., a post-aggression point). Column 578 shows the maximum voltage deviation of an aggressed victim signal with compensation after the aggression point. Ideally, the compensation scheme 500 would not deviate from the non-aggressed victim signal 317C with respect to timing and voltage. However, since compensation schemes typically affects the victim signal, the optimum compensation scheme for a given victim is one that minimizes time deviation and voltage deviation. In the examples of FIG. 5F, for a maximum line length of 3200 μm and a capacitance of 40 fF, the timing deviation in both directions is minimized.

The values used in the FIGS. 5E and 5F are provided for the sake of example. It should be understood that other values may be utilized within the scope of the invention corresponding to other capacitances, line lengths and/or spans, and geometrical relationships (e.g., widths, lengths, spacings, metal layer etc). Further, the attributes generated from the analyses may be stored in the crosstalk compensation library 125 for reference by the placement/routing application 105 and/or the crosstalk compensation module 110. Based on this information in the crosstalk compensation library 125, the placement/routing application 105 and/or the crosstalk compensation module 110 may select a compensation scheme that minimizes voltage and/or timing deviations for a given signal line and place compensation circuits into the device design 115 in accordance with the parameters of the selected scheme.

Figure 6A:
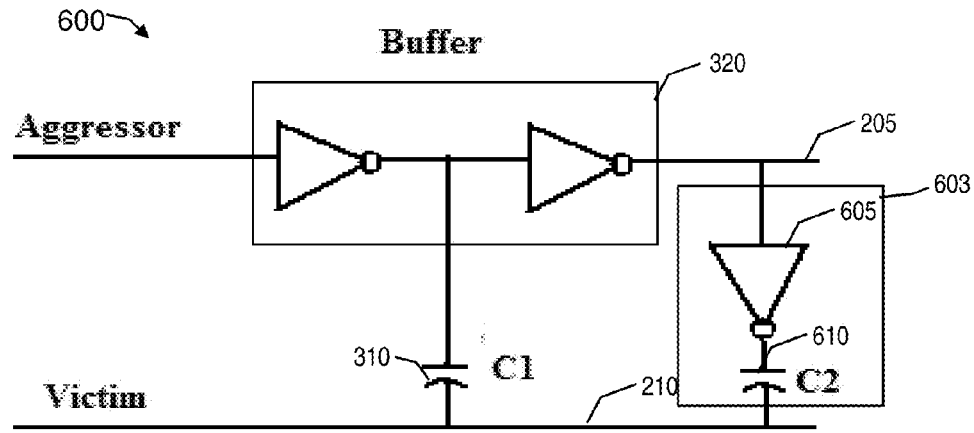
FIG. 6A shows a third crosstalk compensation circuit in accordance with aspects of the invention.

FIG. 6A illustrates a third compensation scheme 600 in accordance with embodiments of the invention. As shown in FIG. 6A, the scheme of FIG. 5A is modified to provide a second compensation signal after the output of the buffer circuit 320. The second compensation signal is in addition to compensation signal provided by compensation capacitor 310. As shown in FIG. 6A, the second compensation signal is produced by a second compensation circuit 603, including an inverter 605 and a second compensation capacitor 610. The input of the inverter 605 is linked to the aggressor 205 in close spatial proximity to the output of the buffer circuit 320. The output of the inverter 605 is linked to the victim 210 via second compensation capacitor 610.

Figure 6B:
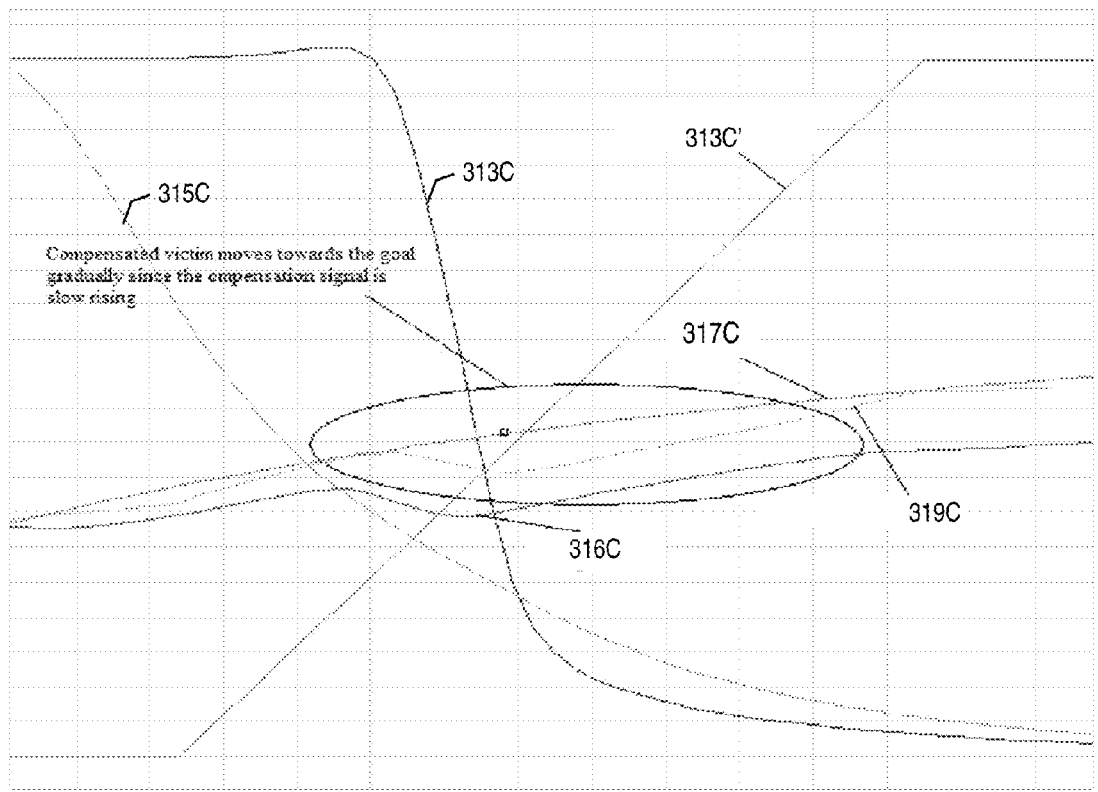

Notably, the previous schemes (e.g., schemes 400 and 500) provided compensation instantaneously at the point of aggression such that the deviation of the compensated victim signal increases with respect to the non-aggressed victim signal 317C (i.e., the "goal") as the distance from the point of aggression increases. As shown in FIG. 6B, the second compensation signal 313C' reduces the deviation (e.g., distortion) of compensated victim signal 319C away from the non-aggressed victim signal 317C. According to aspects of the invention, the first compensation signal 313C is a fast rising signal configured to compensate the aggressor signal 315C at the point of aggression. The second compensation signal 313C' is slow rising signal configured to compensate the aggressor signal 315C after the point of aggression. For comparison, an aggressed victim signal 316C without compensation is also shown.

In embodiments, additional instances compensation scheme 600 may be placed along signal lines at regular intervals to improve the post aggression compensation. The additional instances may include the first compensation circuit (i.e., capacitor 310) and/or the second compensation circuit 603 (i.e., inverter 605 and capacitor 610), depending on, for example, different line lengths. Notably, the improved crosstalk performance provided by the compensation schemes (e.g., scheme 600) advantageously allows fewer repeaters (e.g., 320) to be placed along signal lines.

Figure 6C:
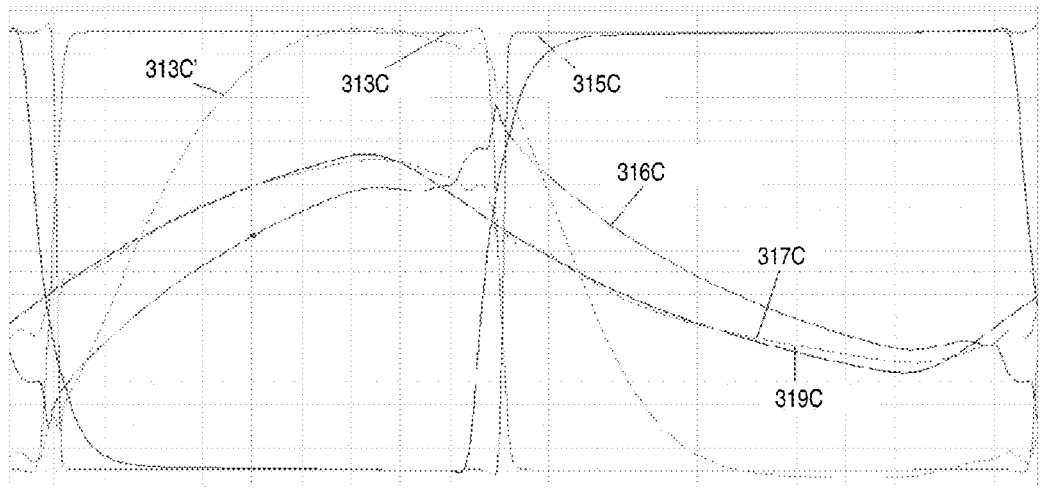
Figure 6D:
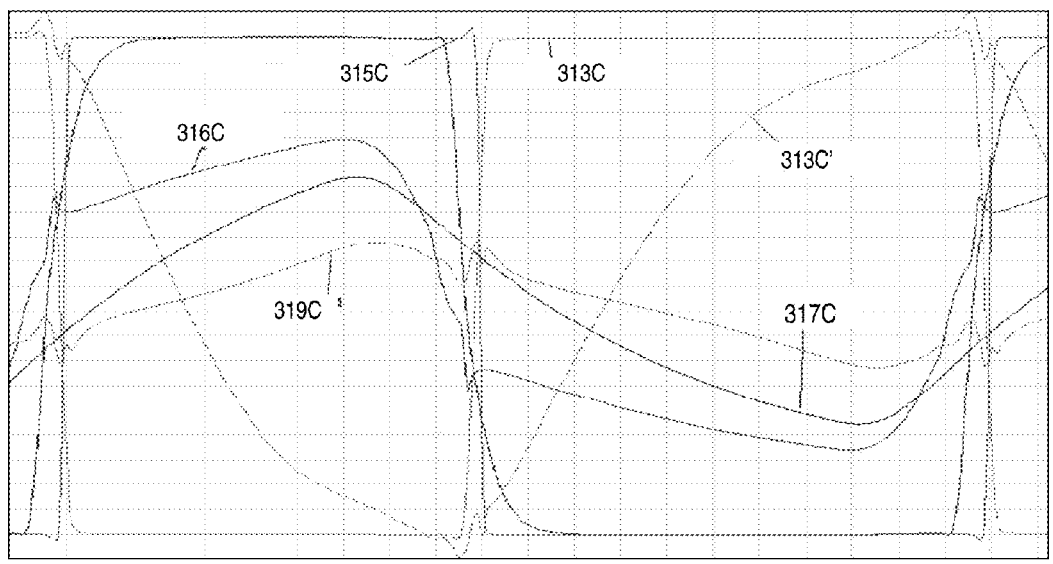

FIG. 6C shows a simulation including data from an embodiment of scheme 600 in which a second compensation circuit is placed at every 800 μm on a 3200 μm line when the aggressor signal 315C and the non-aggressed victim signal 317C are switching in opposite directions and where C1=40 fF, C2=30 fF. FIG. 6D shows the inverse situation in which the aggressor signal 315C and the victim signal 317C are switching in same direction. FIG. 6E illustrates an example of scheme 600 providing a second compensation signal 313C' at every 1600 μm on a 3200 μm line when aggressor and victim are switching in opposite directions and where C1=40 fF, C2=30 fF.

In FIGS. 6C, 6D and 6E, six exemplary signals are illustrated: first compensation signal 313C, second compensation signal 313C', aggressor signal 315C, aggressed victim signal 316C (without compensation), non-aggressed victim signal 317C, and compensated victim signal 319C, wherein the compensation signal 313C is substantially the inverse of the aggressor signal 315C and has substantially the same magnitude. As apparent from FIGS. 6C, 6D and 6E, the introduction of second compensation circuit 605, 610 at every 800 μm is favorable for the case in which the aggressor and the victim are switching in opposite directions but worsens the case where they switch in the same direction. In embodiments, in order to improve the case in which the aggressor signal 315C and the non-aggressed victim signal 317C are switching in the same direction, the second compensation is reduced.

FIG. 6F shows an exemplary data structure including crosstalk and compensation attributes with respect to the crosstalk compensation circuit illustrated in FIG. 6A. The values of FIG. 6F may be obtained from the analyses illustrated in FIGS. 6C, 6D and 6E. For each respective set of compensation capacitances and spacing, deviations caused in the non-aggressed signal were measured on the victim signal occurring in both directions (i.e., the same direction as the aggressor signal and the opposite direction of the aggressor signal). Columns 671 and 672 define the various combinations of compensation capacitance, span and switching direction. Columns 673-678 show the resulting deviations in timing and voltage from the non-aggressed signal for the different combinations. Column 673 shows the maximum timing deviation of an aggressed victim signal without compensation (e.g., deviation from a non-aggressed victim signal). Column 674 shows the maximum timing deviation the aggressed victim signal with compensation. Column 675 shows the maximum voltage deviation at the aggression point (e.g., at buffer circuit 320) of the aggressed victim signal without compensation. Column 676 shows the maximum voltage deviation at the aggression point of the aggressed victim signal with compensation. Column 677 shows the maximum voltage deviation after the aggression point of the aggressed victim signal without compensation. Column 678 shows the maximum voltage deviation after the aggression point with compensation. In the examples of FIG. 6F, scheme 600 with C2 of 15 fF introduced at 1600 μm performs well for almost all cases. Accordingly, in some embodiments scheme 600 of with C2 of 15 fF introduced only at 1600 μm placed in the device design.

Figure 7A:
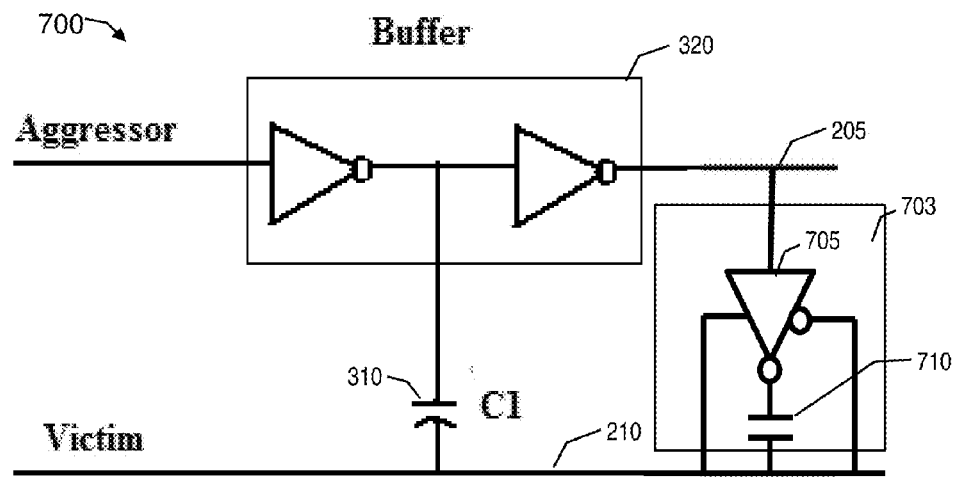
FIG. 7A shows a fourth crosstalk compensation circuit in accordance with aspects of the invention.

FIG. 7A illustrates a fourth compensation scheme 700 in accordance with embodiments of the invention. Advantageously, compensation scheme 700 selectively applies the second compensation signal of scheme 600 (e.g., signal 313C'). In particular, scheme 700 operates the second compensation signal to "catch-up" with the non-aggressed victim signal after the aggression signal and compensation signal. As described previously with respect to scheme 600, placing the second compensation signal at every 800 μm is favorable for the case in which the aggressor and the victim are switching in opposite directions but worsens the case where they switch in the same direction. Accordingly, some moderation in the second compensation signal is desirable. Moreover, such moderation of the second compensation signal can reduce the effectiveness of the overall compensation for the case of opposite switching aggressor and victim. Accordingly, scheme 700 includes a circuit that selectively turns-off the second compensation signal when the aggressor and victim are switching in the same direction and selectively applies the second compensation signal when the aggressor and victim are switching in opposite directions.

In embodiments, the second compensation circuit 703 in compensation scheme 700 comprises an enabled inverter 705 and a second compensation capacitor 710. In embodiments, the enabled inverter gate 705 senses the voltage levels on both the aggressor 205 and victim 210. As shown in FIG. 7, the enabled inverter 705 includes set and reset inputs tied to the victim 210 that function to turn off the second compensation signal when the aggressor and victim are switching in the same direction and applies the second compensation signal when the aggressor and victim are switching in opposite directions. To compensate for a victim that is a reduced swing signal, the circuit of scheme 700 may biased (i.e., tuned to different voltage and timing thresholds by selecting different combinations of resistors) to adjust the time at which the second compensation signal is triggered with respect to the aggressor signal, and partially cut-off the second compensation when not required to cancel the aggressor signal.

Figure 7B:
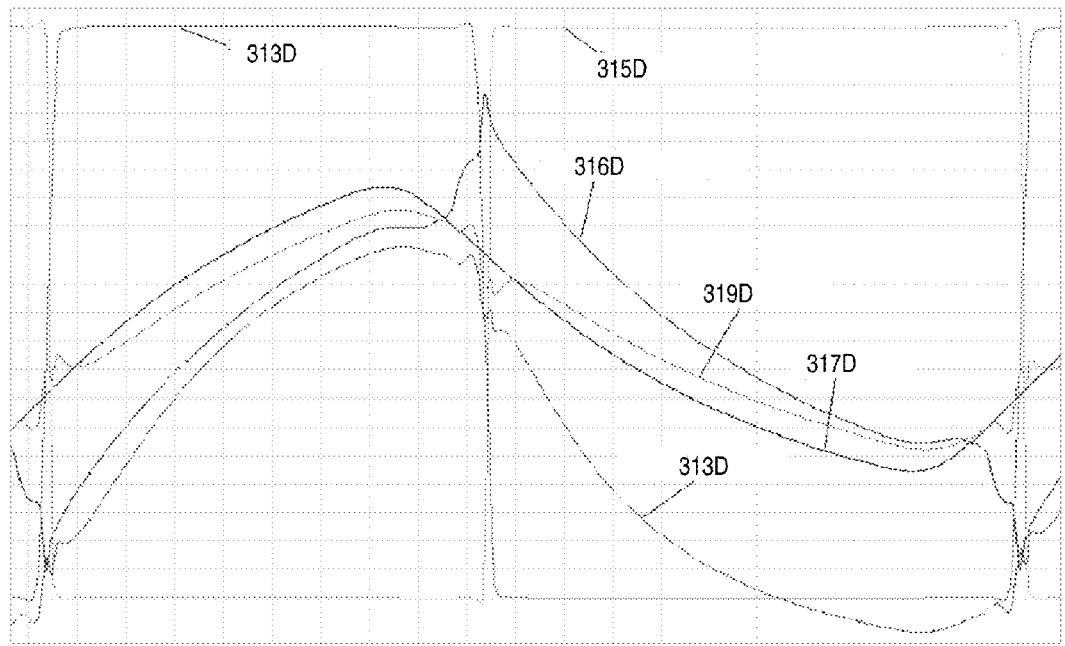
FIG. 7B shows an example of crosstalk and compensation effects in the crosstalk compensation circuit illustrated in FIG. 7A.

FIG. 7B shows six exemplary signal voltages over time: compensation signal 313D, second compensation signal 313D', aggressor signal 315D, aggressed victim signal 316D (without compensation), non-aggressed victim signal 317D, and compensated victim signal 319D, wherein the compensation signal 313D is substantially the inverse of the aggressor signal 315D. In the present example, victim signal 317D moves in opposite direction from the aggressor signal 315D. As in the previous examples, compensation signal 313D moves inversely to aggressor signal 315D.

The values of the capacitances, spans and line lengths used in the FIGS. 3A to 7B are exemplary and it should be understood that other values (e.g., corresponding to other capacitances, line lengths and/or spans such that attributes of victims and aggressors are determined over greater ranges and/or at different levels of granularity) may be used within the scope of the invention. Further, the results of analyzing these and other values may be stored in the crosstalk compensation library 125 for reference by the placement/routing application 105 and/or the crosstalk compensation module 110. Based on the information in the crosstalk compensation library 125, the placement/routing application 105 and/or the crosstalk compensation module 110 may select a compensation scheme that is optimal for a given signal line and the selected scheme may be incorporated into the device design 115.

In schemes 400, 500, 600 and 700 described above, the exemplary data was determined based on an assumption that the victim carries a reduced swing signal (e.g., 0.0 V to 1.0 V) and the aggressor carries a full-swing signal (e.g., 0.0 V to 5.0 V). FIGS. 8A and 8B illustrate another simulation for schemes 400 and 500, respectively, in which the victim is a reduced swing signal in some instances and is a full-swing signal in other instance for circumstances in which the aggressor and victim signals are in the same direction and in opposite directions. Table 800 in FIG. 8A shows simulation data corresponding to scheme 400. It is evident from the values shown in FIG. 8A that the deviation performance of scheme 400 for both full-swing and reduced-swing operation is substantially improved over the uncompensated deviations for both directions (i.e., polarities).

Table 805 in FIG. 8B shows a simulation data of compensation scheme 500. In the case where the victim and aggressor signals have the same direction (i.e., polarity), the deviation performance of scheme 500 for both full-swing and reduced-swing operation is substantially similar. Although it is notable that the deviation of the reduced-swing operation is better away from the aggression point.

Figure 8C:
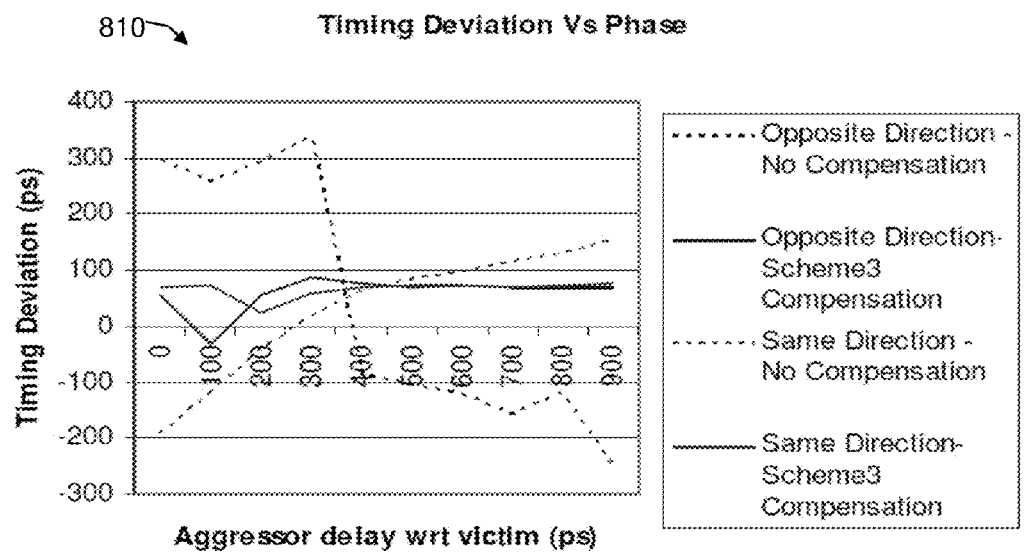
FIGS. 8C and 8D show examples of crosstalk and compensation effects in accordance with aspects of the invention.
Figure 8D:
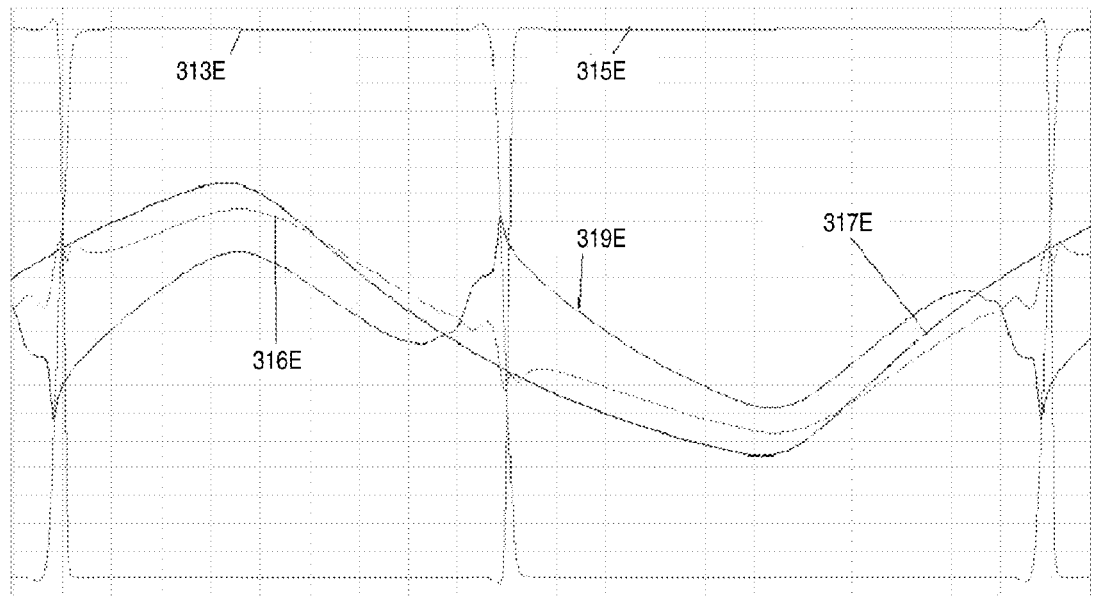

Further, in schemes 400, 500, 600 and 700 above, the exemplary data is based on a scenario in which the victim signal and the aggressor signal are in phase. FIGS. 8C and 8D show graphs 810 and 815 that illustrate an example where the victim and aggressor signals are out of phase. In particular, graphs 810 and show simulation data for scheme 600 in which the aggressor signal is delayed by 300 ps with respect to the victim, wherein C1 and C2 equal to 40 fF and 15 fF. As shown in graph 815 in FIG. 8D, in comparison to the non-aggressed victim signal 317E (i.e., "goal"), the aggressed victim signal 316E is greatly distorted by the aggressor signal 315D. While the phase difference between the non-aggressed victim signal 317E and the aggressor signal 315D generates some spikes in the compensated victim signal 319E, it is evident from the compensated victim signal 319E demonstrates that the compensation significantly improves the deviations in timing and voltage of the victim due to the aggressor.

Additionally, in schemes 400, 500, 600 and 700 above, the exemplary data is based on a scenario in which the victim signal is affected by a single aggressor. FIG. 8E illustrates exemplary data for scheme 600 in a circumstance in which there are two aggressors. In particular, table 815 in FIG. 8E shows example data in with compensation only at 1600 μm on a 3200 μm line with C2 of 15 fF (measured at the falling edge of the victim signal.

According to aspects of the invention, compensation schemes from those described above may be used in different circumstances, e.g., depending on different IC design constraints. In some embodiments, scheme 600 in which at 1600 μm on a 3200 μm line with C2 equal to 15 fF may be the primary scheme considered for crosstalk compensation. In other embodiments, all schemes may be considered to select a compensation scheme for a victim based on its aggressors. According to aspects of the invention, the schemes are comprised of the following: Scheme 400 at every 500 μm and capacitance equal to 40 fF; Scheme 500 at every 800 μm and capacitance equal to 40 fF; Scheme 600 only at 1600 μm and capacitances of 40 fF and 15 fF, respectively; and Scheme 700 at every 700 μm with and capacitances of 40 fF and 30 fF.

Flow Diagram

Figure 9A:
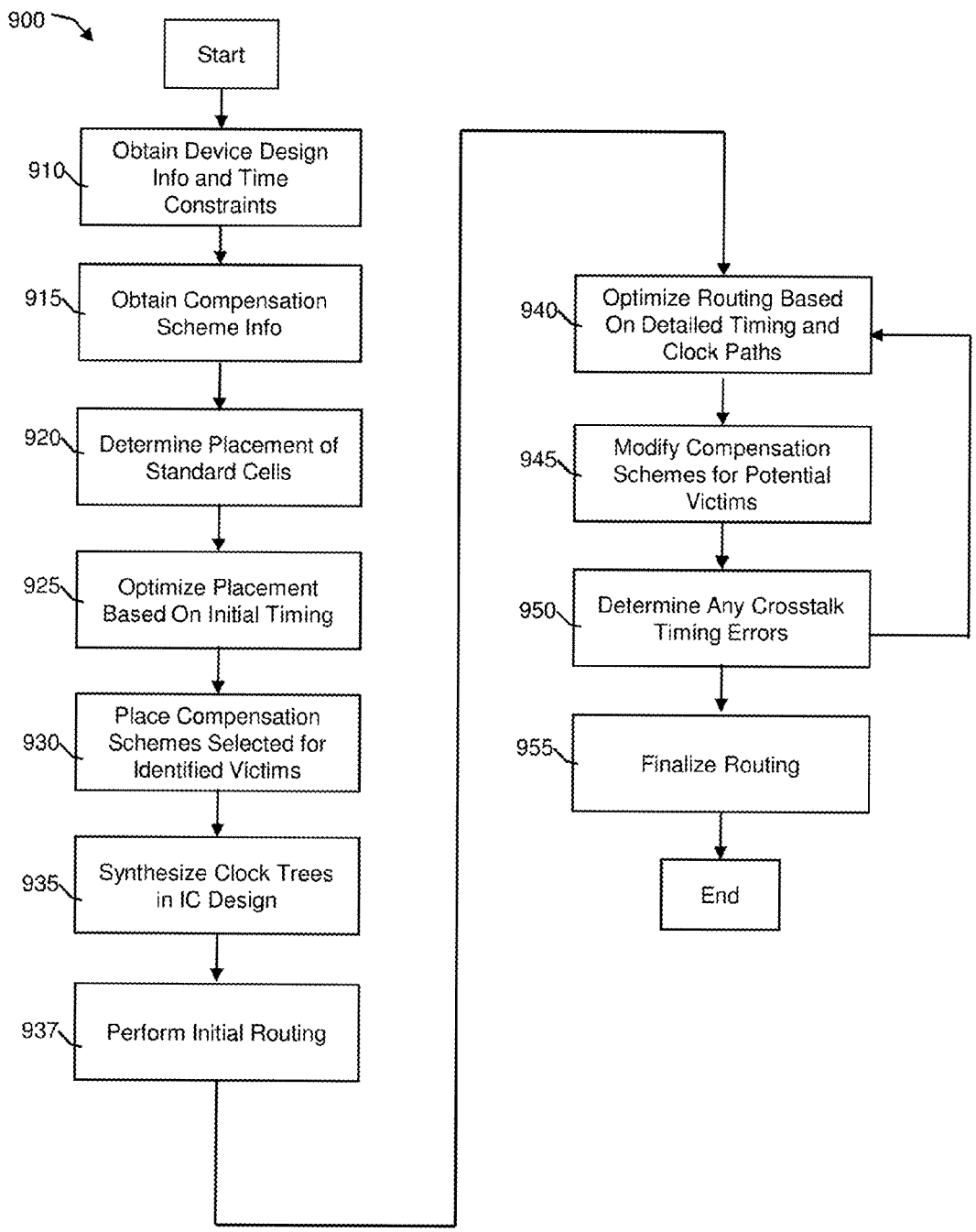
FIG. 9A shows a flow diagram of an exemplary process usable to select and place crosstalk compensation circuits for implementing designs and steps in accordance with aspects of the invention.

FIG. 9A shows an exemplary flow for performing aspects of the present invention. The steps of FIG. 9A may be implemented in the environment of FIG. 1 and using information identified in FIGS. 2A-8E, for example.

The flowchart in FIG. 9A illustrates the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, the invention can take the form of a computer program product accessible from a computer-usable or computer-readable medium providing program code for use by or in connection with a computer or any instruction execution system. The software and/or computer program product can be implemented in the environments of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

FIG. 9A shows a flow diagram of an exemplary design process usable to selectively place compensation schemes in an IC design (e.g., device design 115). In accordance with aspects of the invention, an initial selection and placement of compensation schemes is performed after placement of standard cells (i.e., signal lines) based on preliminary (i.e., approximate) signal paths and timing estimates. Subsequently, after a routing application (e.g., placement/routing application 105) determines specific details of routing and timing, the crosstalk compensation is optimized by iteratively modifying the selected schemes.

At step 910, a computing device (e.g., the computing device 14 using the placement/routing application 105) obtains the physical layout and timing constraints for routing signal lines from a device design (e.g., the device design 115). The device design includes, for example, element definitions and libraries (e.g., VHDL files), design exchange formats (DEF), library exchange formats (LEF), and gate level netlists. Timing constraints include, for example, a number of clocks, phases, arrival times of primary inputs and primary outputs etc.

At step 915, the computing device obtains compensation scheme information from user input and/or stored data, such as crosstalk compensation definitions described with respect to FIG. 1. The obtained crosstalk compensation definitions determine the compensation schemes which the placement/routing application 105 may utilize with the device design. In some embodiments, the crosstalk compensation definitions are automatically obtained from a predetermined library. Additionally or alternatively, a user (e.g., a design engineer) may manually select the crosstalk compensation definitions (e.g., from crosstalk compensation definitions 120) for the device design via an interactive computer-user interface provided to the user by computing device via, e.g., I/O device 28.

At step 920, the computing device determines placement of standard cells (i.e., signal lines) in the device design based on the obtained device design and the timing constraints. For instance, the device design may iteratively determine placement of standard cells between elements (e.g., transmitters and receivers) defined within the device design with reference to predetermined placements of floor plan macros, timing constraints etc.

At step 925, the computing device optimizes the placement of standard cells determined in step 920 based on initial timing. The optimization includes making an initial identification of victims based on the attributes determined during initial placement of elements, including signal lines (e.g., using Steiner wire estimates), in step 920. In accordance with aspects of the invention, the attributes include the following: the number of neighboring aggressors; the relative signal directions of the neighboring aggressors and the potential victims; power, voltage and timing information of the potential victims due the their neighboring aggressors, including systematic and random information; timing deviations of the victims due to the neighboring aggressors; voltage deviations of the victims due to their neighboring aggressors; length of victims (e.g., using Steiner wire estimates); and geometric relationships of the signal lines. In embodiments, the computing device determines some or all of the attributes using software, such as SPECTRE, through which signals can be modeled and/or simulated based on routing and timing information in the device design. In embodiments, because the clock trees have not been routed in the device design, detailed timing information for the clock paths is not known at this step. Accordingly, the initial optimization is performed assuming there are no clock delays or skewing.

At step 930, the computing device selects one or more compensation schemes (e.g., compensation schemes 400, 500, 600 and 700) for victims identified initial optimization in step 925. Different schemes have structures and parameters that are useful for different circumstances. In other words, one scheme may be better than another for a particular victim. Based on the attributes of the identified victims, the computing device (e.g., using the crosstalk compensation module 110) determines where to place the selected scheme along the identified victims in accordance with the parameters of the selected scheme. In this manner, each compensation scheme from step 915 is evaluated for each victim for its effects on timing deviation and voltage deviation (e.g., as shown in FIGS. 5F, 6, 8A, 8B, etc.). In embodiments, the compensation scheme that produces a compensation signal which minimizes the timing and/or voltage deviations for the non-aggressed victim based on aggressor signals switching in both directions (i.e., same and opposite directions to the victim) from the non-aggressed victim signal is selected. In accordance with aspects of the invention, the selection of a compensation scheme is made primarily based on the timing deviation provided by the scheme. By doing so, the impact of the selected compensation scheme in the timing constraints for a signal line (or net) is minimized.

Still referring to step 930, the computing device places compensation circuits corresponding to the selected compensation schemes in the device design 115 along the signal lines of the corresponding victims. For example, upon selecting scheme 600 for the victim, placement/routing application 105 places one or more instances of the compensation circuit including a buffer (e.g., buffer circuit 320), inverter (e.g., inverter 605) and compensation capacitors (e.g., capacitors 310 and 610) at locations along the victim defined by the compensation scheme (e.g., every 1600 μm). Notably, the computing device is not limited to selecting a single compensation scheme for a victim. In some embodiments, placing different compensation schemes may be used along the length of a single victim. For instance, some of the predefined compensation schemes may be comprised of more than one of the above-described schemes. For instance, a scheme selectable by the routing application may include both schemes 600 and 700.

At step 935, the computing device, synthesizes clock trees in the device design. In embodiments, this may be performed in a conventional manner, such that clock trees are built from clock sources (i.e., roots) and fanned out (e.g., as leaves) within the device design to carry clock signals to the various elements of the design based on the constraints and elements in device design.

At step 937, the computing device performs an initial (i.e., "first-cut") routing of signal lines. In embodiments, the initial routing of signal lines includes determining (e.g., by the placement/routing application 105) the actual paths of metal layers that connect elements (e.g., transmitters and receivers) within the device design.

At step 940, the computing device re-optimizes the routing based on the timing with real clock trees. That is, after the clock trees are placed within the device design at step 935 and initial routing is performed in step 937, accurate evaluations (e.g., using modeling and simulation) of the design's timing may be performed based on, for example, latency and skew in each of the clocks trees. Using this information, the computing device performs timing optimization using the accurate clock delay estimates and optimizes the clock tree paths to improve their latency/skew.

At step 945, the computing device modifies the compensation schemes 905 previously selected at step 930 based on the optimized routing, timing and clock paths determined in step 940. The computing device may modify the selected compensation schemes for the victims previously identified in the design. Additionally, the computing device may identify new potential victims. For instance, having determined the detailed timing and clock paths, the routing device determines optimized routes (e.g., that the Steiner estimates may not have identified in the initial optimization) using the optimized routing information, the computing device may identify long signal lines in the design (e.g., line lengths of 2000 µm to 3000 µm).

For each identified victim identified in step 945, and using the detailed timing information, the computing device recalculates the crosstalk attributes (shown in FIG. 9B described in greater detail below). Based on the crosstalk attributes, the computing device selects a compensation scheme (e.g., in a similar manner to step 930) and places and/or modifies instances of the scheme's compensation circuits in the device design according to each scheme's parameters.

At step 950, the computing device cyclically determines whether any crosstalk timing errors are present in the device design based on timing path information. In the event that such errors are found, process returns to step 940 where the computing device re-optimizes the routing based on timing and clock paths and modifies the compensation schemes at step 945. In this manner, the identification and selection, and modification steps 940, 945, 950 are iteratively performed to minimize and/or eliminate any crosstalk timing issues (e.g., errors). In the event that no errors are found at step 950, then at step 955 the computing device finalizes the routing in device design and the process ends.

In embodiments, the computing device may determine that none of the compensation schemes are sufficient to reduce voltage deviations, while staying within an acceptable range of timing deviations. For instance, a victim may have insufficient slack such that all of the compensation schemes are unacceptable due to failure to meet the timing constraints. In such a case, the computing device may compensate for crosstalk in a conventional manner, such as increasing the spacing between the aggressor and the signal lines. Upon determining that crosstalk and/or timing issues are minimized at step and/or eliminated in step 950, the signal line routing in finalized at step 960 and stored in the device design.

In accordance with aspects of the invention, the computing device (e.g., computing device 14 using placement/routing application 105 and/or crosstalk compensation module 110) determines crosstalk attributes of each victim and its aggressors and stores the determined crosstalk attributes in the crosstalk compensation library for reference during the process 900. FIG. 9B illustrates an exemplary crosstalk compensation library 125 that holds information determined for each identified victim. In embodiments, the crosstalk attributes include: an identifier of the victim 901 (i.e., long interconnect (Net) name); aggressor details 902 including number of aggressors, switching direction and phase information; power, voltage and timing (PVT) information of the victim 903, including systematic and timing information; timing and voltage deviation of the victim signal without compensation 904; an identifier of compensation scheme 905 selected during placement; locations and instances (i.e., occurrences) of the selected compensation scheme 906; timing and voltage deviation with compensation 907; and compensation scheme selected from detailed design 908. The placement/routing application 105 may reference the information included in crosstalk compensation library 125 to identify and compensate during the steps of the process 900. The timing and/or voltage deviations from the non-aggressed victim signal (i.e., the goal) may be obtained from simulation applications, such as SPECTRE, from which the crosstalk compensation library 125 shown in FIG. 9B may be built.

Figure 10:
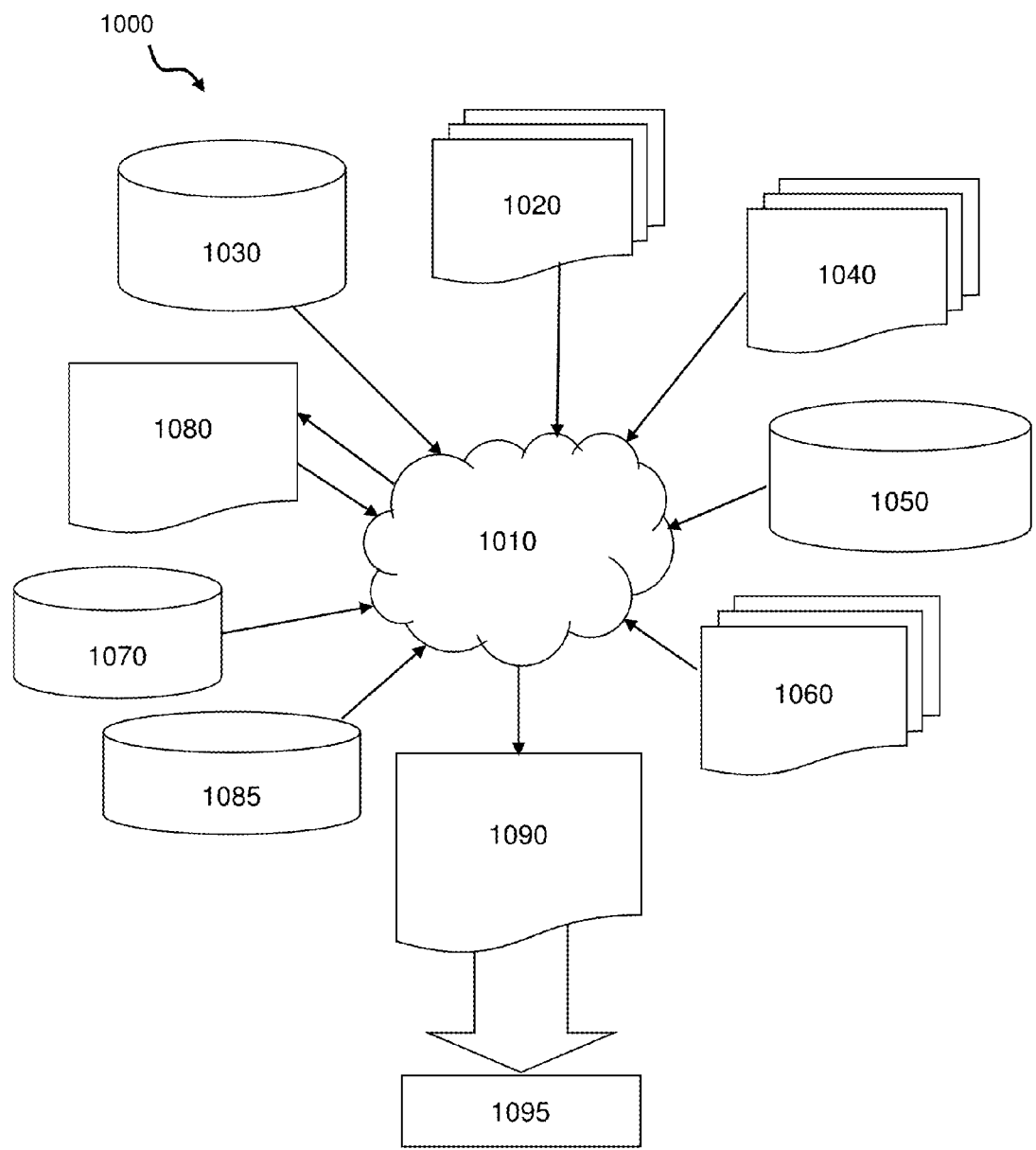
FIG. 10 is a flow diagram of a design process used in device design, manufacture, and/or test.

FIG. 10 shows a block diagram of an exemplary design flow 1000 used for example, in semiconductor IC logic design, simulation, test, layout, and manufacture. Design flow 1000 includes processes, machines and/or mechanisms for processing design structures or devices to generate logically or otherwise functionally equivalent representations of the design structures and/or devices described above and shown in FIGS. 4A, 5A, 6A and 7A. The design structures processed and/or generated by design flow 1000 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array). Design flow 1000 may vary depending on the type of representation being designed. For example, a design flow 1000 for building an application specific IC (ASIC) may differ from a design flow 1000 for designing a standard component or from a design flow 1000 for instantiating the design into a programmable array, for example a programmable gate array (PGA) or a field programmable gate array (FPGA) offered by Altera® Inc. or Xilinx® Inc.

FIG. 10 illustrates multiple such design structures including an input design structure 1020 that is preferably processed by a design process 1010. Design structure 1020 may be a logical simulation design structure generated and processed by design process 1010 to produce a logically equivalent functional representation of a hardware device. Design structure 1020 may also or alternatively comprise data and/or program instructions that when processed by design process 1010, generate a functional representation of the physical structure of a hardware device. Whether representing functional and/or structural design features, design structure 1020 may be generated using electronic computer-aided design (ECAD) such as implemented by a core developer/designer. When encoded on a machine-readable data transmission, gate array, or storage medium, design structure 1020 may be accessed and processed by one or more hardware and/or software modules within design process 1010 to simulate or otherwise functionally represent an electronic component, circuit, electronic or logic module, apparatus, device, or system such as those shown in FIGS. 4A, 5A, 6A and 7A. As such, design structure 1020 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++. Design process 1010 preferably employs and incorporates hardware and/or software modules for synthesizing, translating, or otherwise processing a design/simulation functional equivalent of the components, circuits, devices, or logic structures shown in FIGS. 4A, 5A, 6A and 7A to generate a Netlist 1080 which may contain design structures such as design structure 1020. Netlist 1080 may comprise, for example, compiled or otherwise processed data structures representing a list of wires, discrete components, logic gates, control circuits, I/O devices, models, etc. that describes the connections to other elements and circuits in an integrated circuit design. Netlist 1080 may be synthesized using an iterative process in which netlist 1080 is resynthesized one or more times depending on design specifications and parameters for the device. As with other design structure types described herein, netlist 1080 may be recorded on a machine-readable data storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means. Design process 1010 may include hardware and software modules for processing a variety of input data structure types including Netlist 1080. Such data structure types may reside, for example, within library elements 1030 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 1040, characterization data 1050, verification data 1060, design rules 1070, and test data files 1085 which may include input test patterns, output test results, and other testing information. Design process 1010 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 1010 without deviating from the scope and spirit of the invention. Design process 1010 may also include modules for performing standard circuit design processes such as timing analysis, verification, design rule checking, place and route operations, etc.

Design process 1010 employs and incorporates logic and physical design tools such as HDL compilers and simulation model build tools to process design structure 1020 together with some or all of the depicted supporting data structures along with any additional mechanical design or data (if applicable), to generate a second design structure 1090. Design structure 1090 resides on a storage medium or programmable gate array in a data format used for the exchange of data of mechanical devices and structures (e.g. information stored in a IGES, DXF, Parasolid XT, JT, DRG, or any other suitable format for storing or rendering such mechanical design structures). Similar to design structure 1020, design structure 1090 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIGS. 4A, 5A, 6A and 7A. In one embodiment, design structure 1090 may comprise a compiled, executable HDL simulation model that functionally simulates the devices shown in FIGS. 4A, 5A, 6A and 7A.

Design structure 1090 may also employ a data format used for the exchange of layout data of integrated circuits and/or symbolic data format (e.g. information stored in a GDSII (GDS2), GL1, OASIS, map files, or any other suitable format for storing such design data structures). Design structure 1090 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIGS. 4A, 5A, 6A and 7A. Design structure 1090 may then proceed to a stage 1095 where, for example, design structure 1090: proceeds to tape-out, is released to manufacturing, is released to a mask house, is sent to another design house, is sent back to the customer, etc.

The method as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A crosstalk compensation structure between an aggressor and a victim comprising:
   a signal buffer comprising a first inverter and a second inverter connected in series in the aggressor; and
   a compensation circuit linking the signal buffer to the victim via a first capacitor, wherein the compensation circuit is structured and arranged to reduce distortion of a signal in the victim by reducing crosstalk between the aggressor and the victim.

2. The structure of claim 1, wherein the compensation circuit comprises a third inverter connecting the aggressor and the victim, the third inverter comprising:
   an input connected to the aggressor and an input of the first inverter; and
   an output connected to the victim via the first capacitor.

3. The structure of claim 2, wherein:
   the first capacitor has a capacitance of about 40 fF; and
   plural instances of the compensation circuit are placed about every 500 μm along a length of the victim.

4. The structure of claim 1, wherein the compensation circuit comprises a wire connecting the aggressor and the victim, the wire comprising:
   a first end connected to the aggressor and an output of the first inverter; and
   a second end connected to the victim via the first capacitor.

5. The structure of claim 4, wherein the compensation circuit further comprises a third inverter connecting the aggressor and the victim, the third inverter comprising:
   an input connected to the aggressor and an output of the second inverter; and
   an output connected to the victim via a second capacitor.

6. The structure of claim 5, wherein:
   the first capacitor has a capacitance of about 40 fF;
   the second capacitor has a capacitance of about 15 fF; and
   an instance of the compensation circuit is placed at about 1600 μm along a length of the victim.

7. The structure of claim 5, wherein:
   the first capacitor has a capacitance of about 40 fF;
   the second capacitor has a capacitance of about 30 fF; and
   plural instances of the compensation circuit are placed about every 500 μm along a length of the victim.

8. The structure of claim 1, wherein the compensation circuit comprises an enabled inverter circuit connecting the aggressor and the victim, the enabled inverter circuit comprising:
   a first input connected to the aggressor and an output of the second inverter;
   set and reset inputs connected to the victim; and
   an output connected to the victim via a second capacitor.

9. The structure of claim 8, wherein:
   the first capacitor has a capacitance of about 40 fF;
   the second capacitor has a capacitance of about 30 fF; and
   plural instances of the compensation circuit are placed about every 700 μm along a length of the victim.

10. A method for compensating for crosstalk coupling between aggressors and victims in a device design, comprising:
    identifying a victim having one or more aggressors;
    determining crosstalk attributes of the victim and the one or more aggressors;
    for a plurality of predetermined compensation schemes, determining a deviation between a non-aggressed victim signal and an aggression-compensated victim signal; and
    selecting one of the plurality of the predetermined compensation schemes that minimizes the determined deviation from the non-aggressed victim signal,
    wherein the identifying, the determining crosstalk attributes and the determining the deviation and the selecting are performed using a computing device.

11. The method of claim 10, further comprising, determining a placement of one or more instances of a compensation circuit corresponding to the selected compensation scheme along the victim at locations defined by the compensation scheme.

12. The method of claim 11, wherein the deviation is a timing deviation.

13. The method of claim 12, wherein the determining a placement of the one or more instances of the compensation circuit comprises, for each compensation circuit:
    determining a placement of a signal buffer in the aggressor, the buffer including a first inverter having the aggressor as its input and a second inverter as its output;
    determining a connection between an input of a third inverter and the input of the first inverter; and
    determining a connection between an output of the third inverter, the victim and a capacitor.

14. The method of claim 12, wherein the determining a placement of the one or more instances of the compensation circuit comprises, for each compensation circuit:
    determining a placement of a signal buffer in the aggressor, the buffer including a first inverter having the aggressor as its input and a second inverter as its output; and
    determining a connection between the output of the first inverter, the victim and a capacitor.

15. The method of claim 14, wherein the determining a placement of the one or more instances of the compensation circuit comprises, for each compensation circuit:
    determining a connection between an input of a third inverter and an output of the signal buffer; and
    determining a connection between an output of the third inverter, the victim and a second capacitor.

16. The method of claim 14, wherein the determining a placement of the one or more instances of the compensation circuit further comprises:
    determining a connection between a first input of an enabled inverter circuit and an output of the signal buffer;
    determining a connection between set and reset inputs of the enabled inverter circuit and the victim; and
    determining a connection between an output of the enabled inverter circuit, the victim and a second capacitor.

17. The method of claim 10, wherein the determining crosstalk attributes comprises one or more of:
    determining a number of the one or more aggressors corresponding to the victim,
    determining respective signal directions of the one or more aggressors and the victim,
    determining power, voltage and timing information for the victim including systematic and random information,
    determining timing deviations of the victim due the one or more aggressors, and
    determining voltage deviations of the victim due the one or more aggressors.

18. The method of claim 17, further comprising storing the determined crosstalk attributes in a database.

19. The method of claim 11, further comprising iteratively modifying the selected compensation scheme based on detailed timing and clock information determined after the selecting.

20. A system comprising:
a compensation circuit connecting a first signal line to a second signal line of an integrated circuit, wherein the compensation circuit is structured and arranged to reduce distortion of a signal in the second signal line by reducing the effect of crosstalk between the first and second signal lines;
the crosstalk is caused by capacitive coupling between the first and second signal lines;
the compensation circuit provides a compensation signal that is substantially a same magnitude and opposite polarity as the capacitive coupling; and
the compensation circuit comprises a compensation line connecting the first signal line and the second signal line, and a compensation capacitor in the compensation line.

* * * * *